(12) United States Patent
Shibata

(10) Patent No.: US 11,960,565 B2
(45) Date of Patent: Apr. 16, 2024

(54) ADD-MULITPLY-ADD CONVOLUTION COMPUTATION FOR A CONVOLUTIONAL NEURAL NETWORK

(71) Applicant: NEC CORPORATION, Tokyo (JP)

(72) Inventor: Seiya Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 890 days.

(21) Appl. No.: 16/977,282

(22) PCT Filed: Feb. 28, 2019

(86) PCT No.: PCT/JP2019/007770
§ 371 (c)(1),
(2) Date: Sep. 1, 2020

(87) PCT Pub. No.: WO2019/168088
PCT Pub. Date: Sep. 6, 2019

(65) Prior Publication Data
US 2021/0004701 A1 Jan. 7, 2021

(30) Foreign Application Priority Data
Mar. 2, 2018 (JP) .................................. 2018-038028

(51) Int. Cl.
*G06F 17/15* (2006.01)
*G06F 17/10* (2006.01)
(Continued)

(52) U.S. Cl.
CPC ............ *G06F 17/153* (2013.01); *G06F 17/10* (2013.01); *G06N 3/04* (2013.01); *G06N 5/04* (2013.01);
(Continued)

(58) Field of Classification Search
CPC ....... G06F 17/153; G06F 17/10; G06V 10/70; G06V 10/82; G06N 3/04; G06N 5/04
See application file for complete search history.

(56) References Cited

U.S. PATENT DOCUMENTS 5,422,983 A * 6/1995 Castelaz ................ G06N 3/063
706/42
5,473,730 A 12/1995 Simard
(Continued)

FOREIGN PATENT DOCUMENTS

| JP | H04-51384 A | 2/1992 |
|----|-------------|--------|
| JP | 07-191950 A | 7/1995 |

(Continued)

OTHER PUBLICATIONS

Lavin et al. Fast Algorithms for Convolutional Neural Networks. 2015 (Year: 2015).*
(Continued)

*Primary Examiner* — Alexey Shmatov
*Assistant Examiner* — Robert Bejcek, II
(74) *Attorney, Agent, or Firm* — Sughrue Mion, PLLC

(57) ABSTRACT

An inference device comprises a weight storage part that stores weights, an input data storage part that stores input data, and a PE (Processing Element) that executes convolution computation in convolutional neural network using the weights and input data. The PE adds up weight elements to be multiplied with elements of the input data for each of variable values of the elements of the input data. The PE multiplies each of the variable values of the elements of the input data with each cumulative sum value of weights corresponding to the variable values of the elements of the input data. The PE adds up a plurality of multiplication results obtained by the multiplications.

17 Claims, 14 Drawing Sheets

(51) Int. Cl.
  *G06N 3/04* (2023.01)
  *G06N 5/04* (2023.01)
  *G06V 10/28* (2022.01)
  *G06V 10/70* (2022.01)
  *G06V 10/82* (2022.01)
(52) U.S. Cl.
  CPC .............. *G06V 10/70* (2022.01); *G06V 10/82* (2022.01); *G06V 10/28* (2022.01)

(56) References Cited

U.S. PATENT DOCUMENTS

| 9,600,763 | B1 | 3/2017 | Kasagi | |
| 2015/0199963 | A1* | 7/2015 | Maaninen | G10L 15/16 704/232 |
| 2017/0091581 | A1 | 3/2017 | Watanabe et al. | |
| 2020/0005131 | A1 | 1/2020 | Nakahara et al. | |
| 2020/0073912 | A1 | 3/2020 | Hiroi et al. | |

FOREIGN PATENT DOCUMENTS

| JP | 2016-157219 A | 9/2016 |
| JP | 2017-068577 A | 4/2017 |
| JP | 2017-078934 A | 4/2017 |
| JP | 6183980 B1 | 8/2017 |
| WO | 2019/064774 A1 | 4/2019 |

OTHER PUBLICATIONS

Denis A. Gudovskiy et al., "ShiftCNN: Generalized Low-Precision Architecture for Inference of Convolutional Neural Networks", Jan. 24, 2018, online, searched on Jan. 24, 2018, internet <URL: https://arxiv.org/pdf/1706.02393>.
Matthieu Courbariaux et al., "Binarized Neural Networks: Training Neural Networks with Weights and Activations Constrained to +1 or −1", Jan. 24, 2018, [online], searched on Jan. 24, 2018], internet<URL: https://arxiv.org/pdf/1602.02830>.
Fengfu Li et al., "Ternary weight networks", 30th Conference on Neural Information Processing Systems (NIPS 2016), Jan. 24, 2018, [online], searched on Jan. 24, 2018, internet<URL: https://arxiv.org/pdf/1605.04711>.
Daisuke Miyashita et al., "Convolutional Neural Networks using Logarithmic Data Representation", Jan. 24, 2018, [online], searched on Jan. 24, 2018, internet<URL: https://arxiv.org/pdf/1603.01025v2>.
International Search Report for PCT/JP2019/007770, dated May 14, 2019.
Japanese Office Action for JP Application No. 2020-503606 dated Nov. 30, 2021 with English Translation.

* cited by examiner

ADD-MULITPLY-ADD CONVOLUTION COMPUTATION FOR A CONVOLUTIONAL NEURAL NETWORK

CROSS-REFERENCE TO RELATED APPLICATION

This application is a National Stage of International Application No. PCT/JP2019/007770 filed Feb. 28, 2019, claiming priority based on Japanese Patent Application No. 2018-038028 filed Mar. 2, 2018, the disclosure of which is incorporated herein in its entirety.

The present invention relates to an inference device, a convolution computation method and program.

FIELD

Background

Recently, the development of image recognition technologies by multi-layer neural network is active. Such technology is also referred to as "deep learning". Particularly, in a technical field of the image recognition and the like, convolutional neural network is used frequently. The convolutional neural network includes a convolutional layer, a pooling layer and a fully connected layer as described later on. In the convolutional layer, a process is executed in which a kernel is convoluted into an entire image.

The process for convoluting kernel into the entire image (a process in which a filter is applied to the image) provides a set of characteristics (features) convoluted into image. The set of characteristics is also referred to as "feature map". The feature map is obtained by applying an activation function to a convolutional resultant value. For example, in a field of image recognition, ReLU (Rectified Linear Unit) is often used as the activation function.

As described above, in the convolutional layer, kernels (weights, filter) are convoluted into image (input image). In such process, a large number of processes are executed to multiply each pixel of the image with weights.

Non-Patent Literature (NPL) 1 discloses a technology in which input data is expanded to power-of-two representation before convolution computation, and the expanded input data is used in the convolution computation. In Non-Patent Literature 1, the convolution computation is executed in such manner that, total sum of the input data element values which have been expanded to power-of-two representation is calculated for each of variable weight element values, the input data element value is multiplied with the weight element value for each of the weights, and the multiplication results are added up.

Non-Patent Literatures 2 to 4 disclose technologies relating to "quantization" in CNN (Convolutional Neural Network) inference. Non-Patent Literature 2 discloses a technology for converting a convolution computation result into Binary data. Non-Patent Literature 3 discloses a technology for converting a convolution computation result into Ternary data. Non-Patent Literature 4 discloses a technology for converting a convolution computation result into 4-bits data.

The technologies disclosed in Non-Patent Literatures 2 and 3 limit a range of the convolution computation result and execute re-learning to determine parameters. On the other hand, in the technology of Non-Patent Literature 4, the convolution computation result (integer, floating point etc.) is rounded (transformed) to a power-of-two representation. In the present application, such quantization disclosed in Non-Patent Literature 4 for rounding the convolution computation result into a power-of-two representation is referred to as "logarithmic quantization".

Non-Patent Literature 1: Denis A. Gudovskiy, Luca Rigazio, "ShiftCNN: Generalized Low-Precision Architecture for Inference of Convolutional Neural Networks", Jan. 24, 2018, online, searched on Jan. 24, 2018, internet <URL: https://arxiv.org/pdf/1706.02393>

Non-Patent Literature 2: Matthieu Courbariaux, etc., "Binarized Neural Networks: Training Neural Networks with Weights and Activations Constrained to +1 or −1", Jan. 24, 2018, [online], searched on Jan. 24, 2018], internet 〈URL: https://arxiv.org/pdf/1602.02830〉

Non-Patent Literature 3: Fengfu Li and Bo Zhang, etc., "Ternary weight networks", Jan. 24, 2018, [online], searched on Jan. 24, 2018, internet 〈URL: https://arxiv.org/pdf/1605.04711〉

Non-Patent Literature 4: Daisuke Miyashita, etc., "Convolutional Neural Networks using Logarithmic Data Representation", Jan. 24, 2018, [online], searched on Jan. 24, 2018, internet 〈URL: https://arxiv.org/pdf/1603.01025〉

SUMMARY

Each of the disclosures of the above literatures mentioned on the citation list is to be incorporated herein by reference. The following analyses have been made by the present inventors.

As described above, deep learning, particularly convolutional layer computation, requires a huge number of multiplication processes. The huge number of multiplication processes requires a large-scale hardware or a processor having a powerful computation performance. Thus, technologies, such as those disclosed in Non Patent Literatures 1 to 4, would be required in order to complete convolutional layer computation within a realistic time period, when the scale of the hardware is suppressed or even a processor having a poor computation performance is used.

Herein, in the technology disclosed in Non-Patent Literature 1, total sum of the input data which has been expanded (transformed) to power-of-two representation is calculated for each of the variable weight element values. In Non-Patent Literature 1, the total sum of the transformed input data is multiplied with the variable weight element values so as to reduce the number of multiplications required for the convolution computation. For example, in a case where the weight elements may be represented by 2 bits in size, the variable weight element values are 0, 1, 2, 3. In Non-Patent Literature 1, the total sum of the input data expanded to power-of-two representation is calculated for each of the variable values and the resultant total sum is multiplied with the weight element values.

According to keen analysis by the present inventors, it has found that realizing the technology disclosed in Non-Patent Literature 1 presupposes that the weight element values must be low bits. That is, in Non-Patent Literature 1, since the total sum of input data is calculated for each of the variable weight element values, a register size is huge for storing the total sum of the input data expanded into power-of-two representation in a case where the number of the variable weight element values is increased (i.e., each element value consisting the weight is high bits).

Accordingly, it can be said that there is a presupposition that the weight element values must be low bits in the technology disclosed in Non-Patent Literature 1. However, the weight element values are not always low bits depending on deep learning application, thus it is desired to reduce the number of multiplications in convolution computation even in such cases.

It is a main purpose of the present invention to provide an inference device, a convolution computation method, and a program to contribute to execute convolution computation with a low number of multiplications.

According to a first aspect of the present invention, there it provided an inference device, comprising a weight storage part that stores weights, an input data storage part that stores input data, and a PE (Processing Element) that executes convolution computation in convolutional neural network using the weights and input data, wherein the PE is configured to: add up weight elements to be multiplied with elements of the input data for each of variable values of the elements of the input data, multiply each of the variable values of the elements of the input data with each cumulative sum value of weights corresponding to the variable values of the elements of the input data, and add up a plurality of multiplication results obtained by the multiplying.

According to a second aspect of the present invention, there is provided a convolution computation method for an inference device that comprises a weight storage part that stores weights and an input data storage part that stores input data, executes convolution computation in convolutional neural network using the weights and input data, wherein the method comprises: adding up weight elements to be multiplied with elements of the input data for each of variable values of the elements of the input data, multiplying each of the variable values of the elements of the input data with each cumulative sum value of weights corresponding to the variable values of the elements of the input data, and a adding up a plurality of multiplication results obtained by the multiplying.

According to a third aspect of the present invention, there is provided a non-transient computer readable medium storing a program executed by a computer implemented in an inference device that comprises a weight storage part that stores weights and an input data storage part that stores input data, executes convolution computation in convolutional neural network using the weights and input data, wherein the program causes the computer to execute the following processes: adding up weight elements to be multiplied with elements of the input data for each of variable values of the elements of the input data, multiplying each of the variable values of the elements of the input data with each cumulative sum value of weights corresponding to the variable values of the elements of the input data, and adding up a plurality of multiplication results obtained by the multiplying.

Herein, the program may be stored in a computer readable storage medium. The storage medium may be a non-transient storage medium, such as a semiconductor memory, hard disk, magnetic recording medium, optical recording medium. The present invention may be realized as a computer program product.

According to each of aspects of the present invention and the present disclosure, there are provided an inference device, a convolution computation method and a program that contribute to execute convolution computation by a small multiplication number.

PREFERRED MODES

First, an outline of one exemplary embodiment will be explained. Herein, reference signs described in the outline is expediently appended to each element as one example for an explanatory aid for understanding, but not for limitation by the outline. In addition, a connection line between blocks in each figure comprises both of bidirection and single direction. One-way arrow schematically indicates a main signal (data) flow, but not excluding bidirectional flow. Further, in a circuit diagram, a block diagram, an inner configuration diagram, a connection diagram and the like disclosed in the present application, an input port and an output port are provided on an input end and an output end of each of the connection line, although being omitted in the illustration. The same is applied to an input/output interface.

Figure 1:
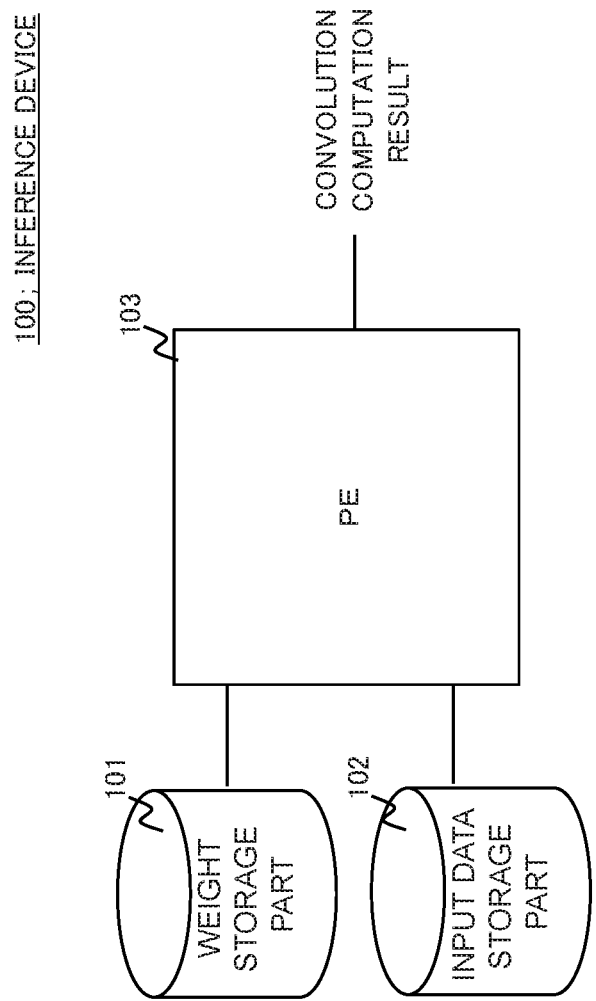
FIG. 1 is an explanatory view of an outline of one exemplary embodiment.

An inference device 100 of one exemplary embodiment comprises a weight storage part 101 that stores weights, an input data storage part 102 that stores input data, and a PE (Processing Element) 103 that executes convolution computation in convolutional neural network using the weights and input data (See FIG. 1). The PE adds up weight elements to be multiplied with elements of the input data for each of variable values of the elements of the input data. The PE multiplies each of the variable values of the elements of the input data with each cumulative sum value of weights corresponding to the variable values of the elements of the input data. The PE adds up a plurality of multiplication results obtained by the multiplications.

As described in detail later on, the convolution computation may be separated to total sum (cumulative sum value) calculation of the weight elements for each of the variable values of the input data elements, multiplication of the total sum of the weight element with the variable value of each element, and summation of the multiplication results. Using such facts, PE 103 calculates the total sum of the weight elements before convolution computation, and multiplies the total sum with the variable value after obtaining of total sum of the weights required for one round of convolution computation. As a result, when compared to a convolution computation method where the weights are multiplied with the input data for every operation and then being added up, the number of multiplications may be reduced.

Concrete exemplary embodiments will be explained in more detail below referring to drawings. Herein, the same component is appended with the same reference sign in each exemplary embodiment, and thus its explanation is omitted.

First Exemplary Embodiment

A first exemplary embodiment will be explained in more detail referring to drawings.

Figure 2:
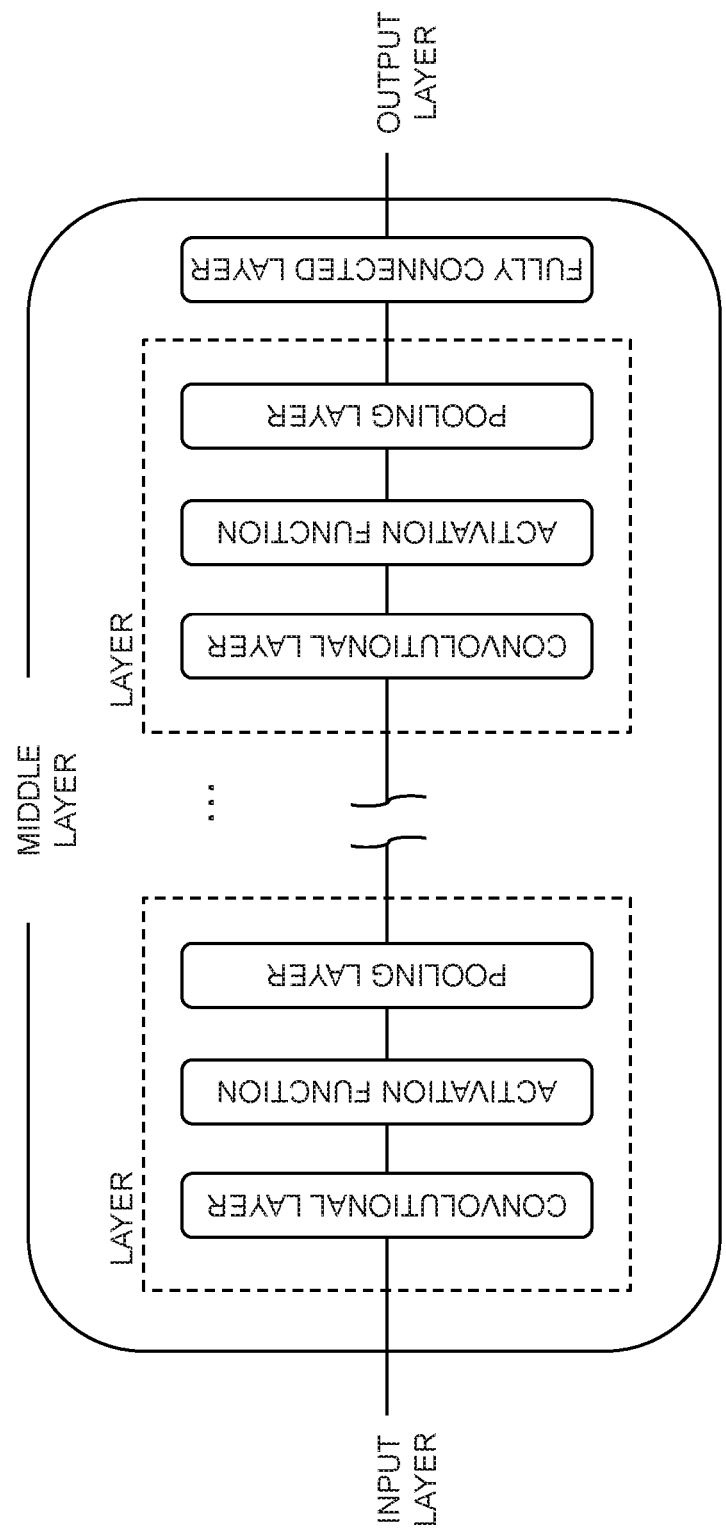
FIG. 2 is an explanatory view of a configuration of a middle layer (hidden layer) in image recognition

FIG. 2 is an explanatory view of a configuration of a middle layer (hidden layer) in image recognition. Referring to FIG. 2, an input layer is connected to the middle layer and the middle layer is connected to an output layer. In the first exemplary embodiment, it is assumed that the data input into the input layer is image data, but the input data processed in the present disclosure is of course not limited to image data.

The input layer generates data to be output to the middle layer from obtained input data. For example, in a case where the image data is configured with 3 channels of RGB (Red Green Blue), the input layer generates image data for each color and output it to the middle layer. The middle layer combines data of feature portions extracted from the input data by a convolutional neural network (CNN (Convolutional Neural Network)) into one node and outputs feature variables. The output layer classifies input data based on the feature variables obtained from the middle layer.

The middle layer comprises a plurality of "layers". A layer of a first stage is connected to the input layer and a layer of the last stage is connected to a fully connected layer.

Each of layers making up the middle layer may comprise a convolutional layer, an activation function, and a pooling layer. Herein, the configuration shown in FIG. 2 is a mere example, but not intended to limit the configuration of the middle layer. In some cases, the middle layer may not include the activation function and the pooling layer.

The convolutional layer extracts feature values from the obtained input data. An activation function is applied to the extracted feature values and the feature values to which the activation function has been applied are input to the pooling layer. In the pooling layer, the obtained feature values are combined. In the pooling layer, a process is executed so that an object is identified as the same object even if the position of the object is changed (a process for obtaining invariance). For example, a process for allowing positional shifting of the object is executed in the pooling layer. In FIG. 2, although a layer for applying the activation function is described as an independent layer from the convolutional layer and the pooling layer, the "activation function" may be configured to be included in any of the convolutional layer and the pooling layer actually.

As illustrated in FIG. 2, the layers making up the middle layer are connected in cascade and an output of a layer of a precedent stage corresponds to an input of a layer of a later stage.

Figure 3:
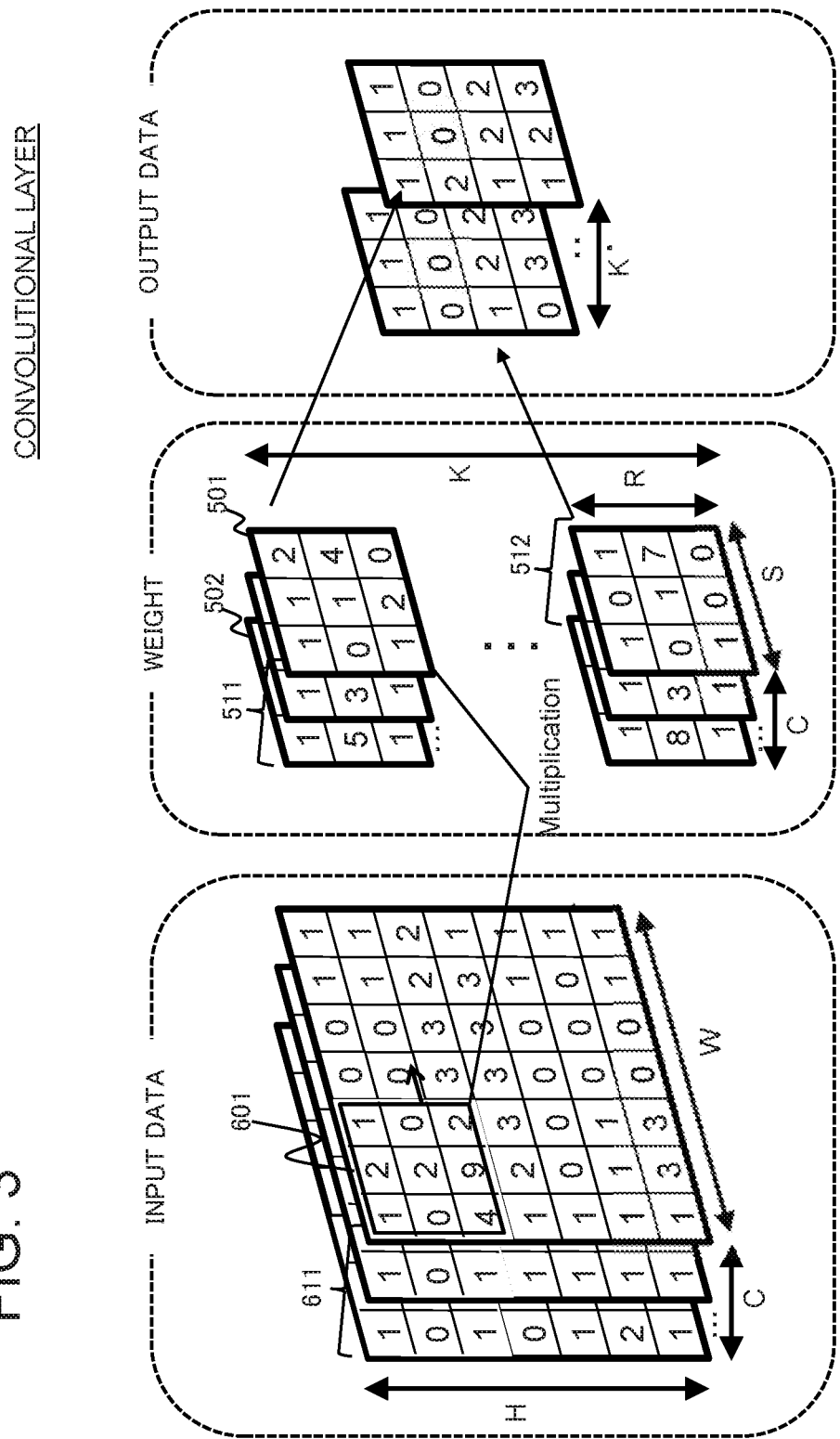
FIG. 3 is an explanatory view of computation (operation) in the convolutional layer.

FIG. 3 is an explanatory view of computation (operation) in the convolutional layer. Referring to FIG. 3, in the convolutional layer, the input data is multiplied with weights (filter) so as to output feature values.

Herein, a variety of parameters used in the present disclosure are defined as shown in FIG. 3. The size in one direction of the input data (vertical direction in FIG. 3) is indicated as "H". In addition, the size in another direction of the input data (width direction in FIG. 3) is indicated as "W". For example, in a case of H=25, W=25, the size of the input data is H×W=625 pixels. Furthermore, the input channel number of the layer is indicated as "C".

The size in one direction of the weight(s) (vertical direction in FIG. 3) is indicated as "R". In addition, the size in the other direction of the weight (width direction in FIG. 3) is indicated as "S". For example, in a case of R=3, S=3, the size of the weight is R×S=9.

"K" indicated in FIG. 3 means the output channel number of the layer. The output channel number K of the layer is equal to the number of weight types. For example, in a case where the number of weight types is "4" as illustrated in FIG. 3, the output channel number K of the layer is "4", too.

One type of weight includes weights of the same number as the number of input channels C. For example, in a case where the input channel number C is "3", one type of weight includes 3 weights. C weights included in one type of weight is respectively associated with C input data. For example, in C weights indicated at the upper row in FIG. 3, the frontmost weights are associated with the frontmost input data.

Herein, in the present disclosure, a set of weights classified per the input channel number C is referred to as a "weight group". Each weight group includes C weights. In addition, the number of weight types is equal to the output channel number K, thus the number of weights in convolutional layer is K×C. Further, in the present disclosure, an illustration direction from one input data or one weight to another input data or another weight is referred to as "channel direction". Similarly, an illustration direction from one weight group to another weight group is referred to as "kernel direction". For example, in FIG. 3, the illustration direction from weights 501 to weights 502 indicates the channel direction, and the illustration direction from weight group 511 to weight group 512 indicates the kernel direction.

In the convolutional layer, the following processes are executed: extracting data corresponding to the size of the weights from the input data; multiplying the elements included in the extracted input data with corresponding weight elements; and adding up the multiplication results in the channel direction. For example, as shown in FIG. 3, in a case where the size of the weight is 3×3=9, data of the same size is extracted from the input data (for example, input data 601 surrounded by a square in the frontmost input data shown in FIG. 3 is extracted). Then, each element of the extracted input data is multiplied with each element of the corresponding weight. For example, in the example shown in FIG. 3, upper left element value "1" in the extracted input data 601 is multiplied with upper left element value "1" in the corresponding weights 501. In the convolutional layer, such process is repeated (9 times of repeats are executed in the above described example). After that, the multiplication results are added up (termed as "multiplication/add-up process).

The multiplication of the extracted input data with the weight is executed between the corresponding (each) input data and (each) weights. For example, in FIG. 3, assume that the weights corresponding to the frontmost input data 601 are the frontmost weights 501. Similarly, in FIG. 3, the weights corresponding to the middle input data are the middle weights, the weights corresponding to the back-end input data are the back-end weights 502. In this case, the above multiplication/add-up process is repeated between the corresponding (each) input data and (each) weights.

Furthermore, the results of the multiplication/add-up process are added up in the channel direction. For example, in the example above, the multiplication/add-up results of 3 channels (frontmost, middle, back end) are added up (accumulated).

The multiplication/add-up process and the subsequent add-up (accumulation) process are executed for each of the weight groups. In the example shown in FIG. 3, calculation using the upper weight group 511 and the input data is executed, and then similar process (multiplication/add-up process using the same input data and subsequent add-up process) is also executed for the lower weight group 512.

In the convolutional layer, such process (the multiplication/add-up process and the add-up process in channel direction) is repeated while changing the extracted input data. For example, as shown in the frontmost input data in FIG. 3, the input data is cut out while sliding a region to be extracted. The process similar to the above process is applied to the cut-out data.

The output data of the convolutional layer is obtained by repeating above stated process in which extraction of the input data, multiplication of the extracted input data with the weight(s) and adding-up them in the channel direction. Herein, since the multiplication/add-up process between the input data and the weights is executed for each of the weight groups as stated above, the number of obtained output data matches with the weight types (the number of the weight groups). For example, in a case where 16 weight groups are prepared, 16 output data are obtained (K=16).

Herein, the size of each output data (the size in vertical direction, the size in width direction) is determined depending on the specification (sliding manner) of the region (window) upon extraction of data from the input data. In the example shown in FIG. 3, data is extracted from the input data in such a manner that 12 (4×3) elements are included in each of the output data.

Figure 4:
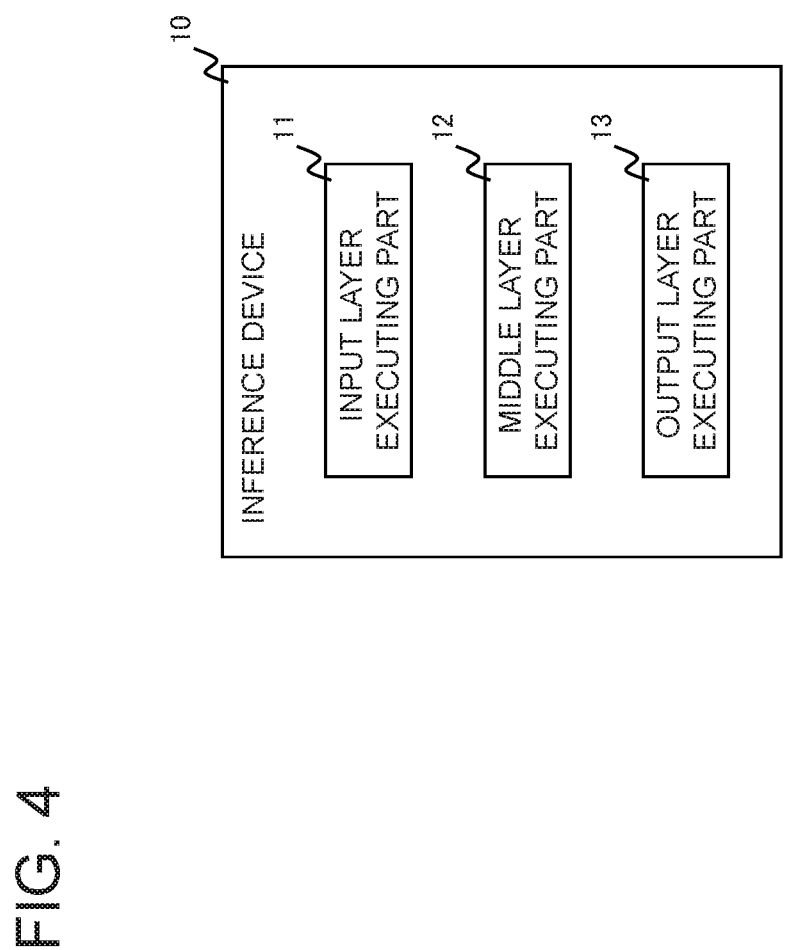
FIG. 4 is a diagram showing one example of inner configuration of the inference device of the first exemplary embodiment.

The inference device 10 of the first exemplary embodiment executes the convolution computation (operation) explained using FIG. 3 within an inference process. Concretely, as shown in FIG. 4, the inference device 10 comprises therein an input layer executing part 11 realizing the input layer, a middle layer executing part 12 realizing the middle layer, and an output layer executing part 13 realizing the output layer. In addition, the middle layer executing part 12 comprises a convolutional layer executing part 31 realizing the convolutional layer, an activation function executing part 32 executing the activation function, and a pooling layer executing part 33 realizing a pooling layer in each of layers (see FIG. 5).

Figure 5:
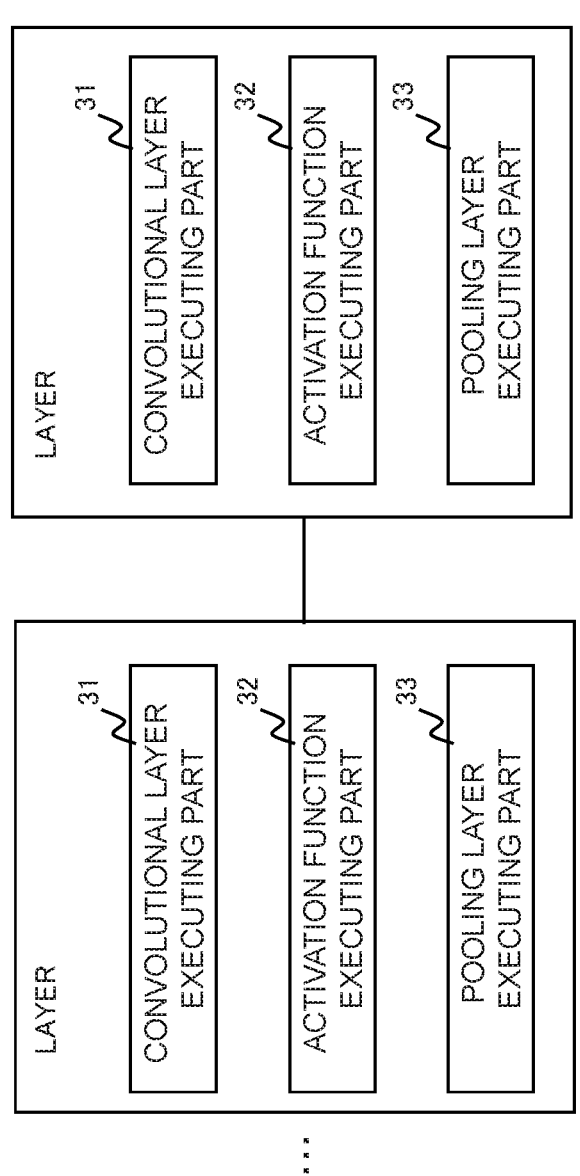
FIG. 5 is a diagram showing one example of inner configuration of the middle layer executing part included in the inference device of the first exemplary embodiment.

In the present disclosure, the convolutional layer executing part 31 is explained in detail among a variety of executing parts illustrated in FIG. 4 and FIG. 5. The other executing parts may be realized by known algorithm(s) etc., thus explanation of them is omitted.

The convolutional layer executing part 31 in each of the layers executes the convolution computation (multiplication/add-up process) explained in FIG. 3 using Processing Element (PE).

Figure 6:
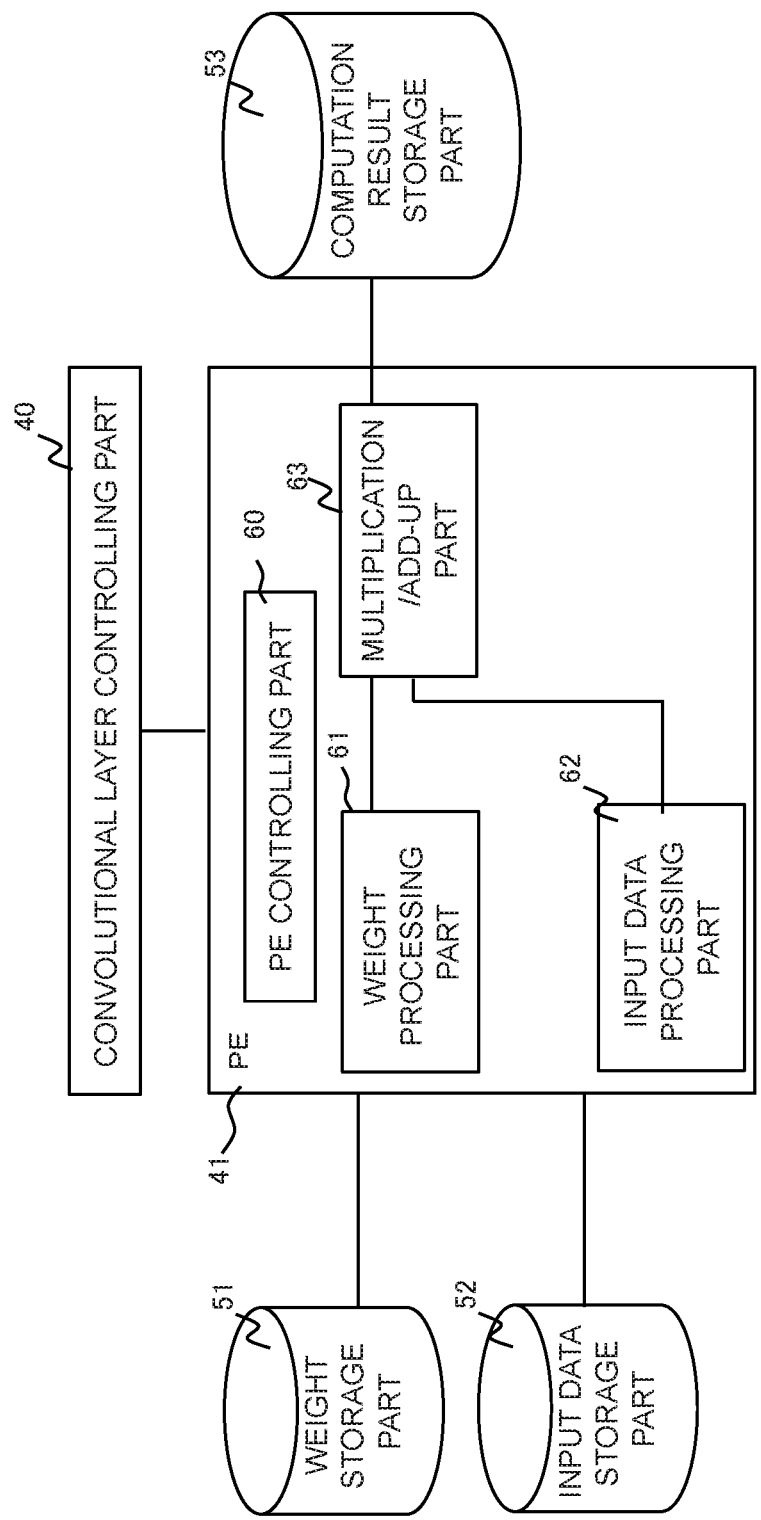
FIG. 6 is a diagram showing one example of inner configuration of the convolutional layer executing part of the first exemplary embodiment.

FIG. 6 is a diagram showing one example of inner configuration of the convolutional layer executing part 31. Referring to FIG. 6, the convolutional layer executing part 31 comprises a convolutional layer controlling part 40, a PE 41, and a variety of storage parts. The variety of storage parts includes a weight storage part 51, an input data storage part 52 and a computation result storage part 53.

The PE 41 executes the convolution computation. Concretely, the PE 41 executes computation including multiplication processes of the input data with the corresponding weight(s). During such processes, the PE 41 accesses to both of the input data storage part 52 and the weight storage part 51 so as to obtain required data (input data and weight(s)). The PE 41 stores a convolution computation result in the convolutional neural network using the weight and input data in the computation result storage part 53.

The convolutional layer controlling part 40 is a means that controls entire convolutional layer. The convolutional layer controlling part 40 controls the PE 41 to realize convolution computation in the convolutional neural network. In addition, the convolutional layer controlling part 40 executes exchange of control information with control modules of the other layers so as to realize entire function as the inference device 10. More concretely, when the convolutional layer controlling part 40 receives a notice of completion of convolution computation from a layer of a preceding stage, the convolutional layer controlling part 40 controls the PE 41 under own management to execute the convolution computation (makes the PE 41 to execute the convolution computation). In addition, the convolutional layer controlling part 40 notifies a layer of a subsequent stage of completion of the convolution computation in own layer.

The weights used in the convolution computation in each layer are stored in the weight storage part 51. The weights stored in the weight storage part 51 may be preset before operation by the inference device 10, or may be received from a superordinate apparatus (for example, a learning apparatus) and stored in the weight storage part 51 for every operation.

The input data storage part 52 stores the input data (output data from the layer of preceding stage; activation).

The PE 41 comprises a PE controlling part 60, a weight processing part 61, an input data processing part 62 and a multiplication/add-up part 63. The PE 41 executes the convolution computation using the input data stored in the input data storage part 52 and the weights stored in the weight storage part 51.

The PE controlling part 60 is a means that controls the weight processing part 61, the input data processing part 62 and the multiplication/add-up part 63 so as to execute the convolution computation using the weights and input data.

The weight processing part 61 executes processes relating to input/output of the weights.

The input data processing part 62 executes processes relating to input/output of the input data.

The multiplication/add-up part 63 is a module that executes the multiplication/add-up process of data respectively provided from the weight processing part 61 and the input data processing part 62 so as to execute the convolution computation.

Figure 7:
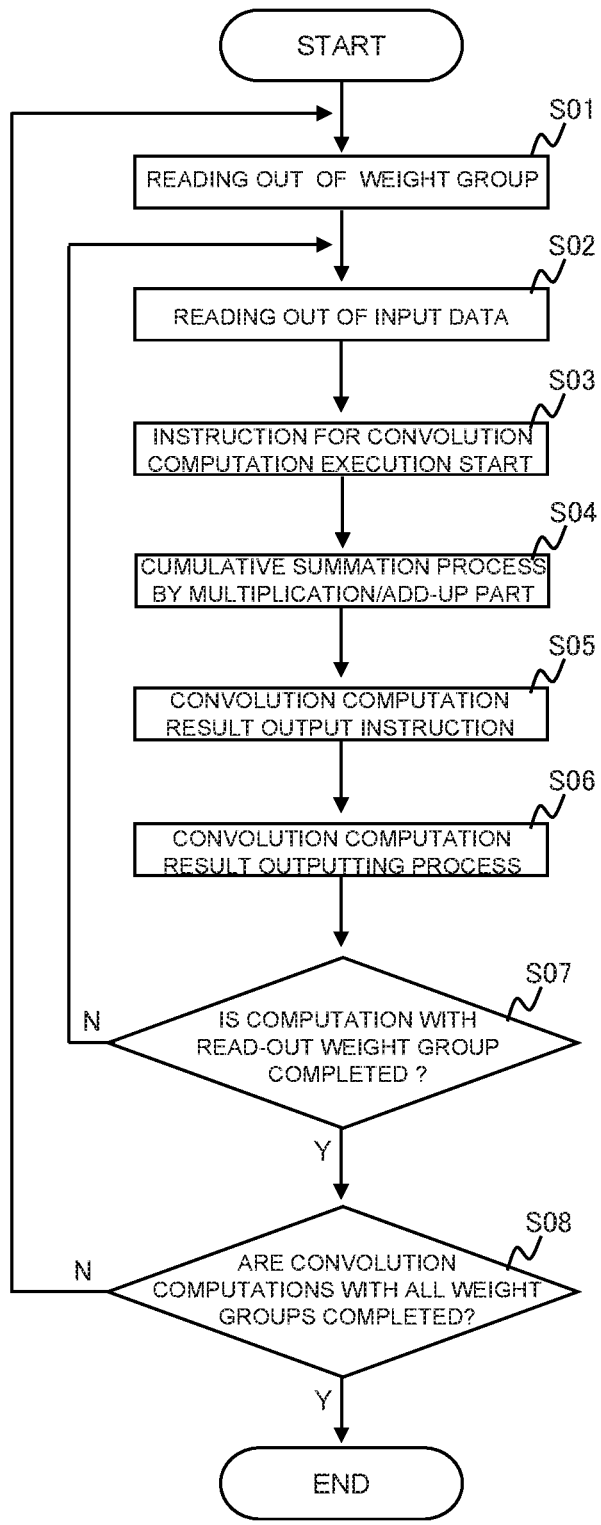
FIG. 7 is a flowchart showing one example of actions by the PE (Processing Element) of the first exemplary embodiment.

First, outline actions by the PE 41 will be explained referring to FIG. 7.

The PE controlling part 60 designates a weight group required for execution of one round of convolution computation and instructs the weight processing part 61 to read out the weight group (step S01).

Next, the PE controlling part 60 designates a range in the input data to be convoluted with the weight group and instructs the input data processing part 62 to read out the input data (step S02).

For example, referring to FIG. 3, it is instructed to execute the convolution computation with the weight group 511 and the corresponding input data 611 (one round of convolution computation). Due to this convolution computation, upper left "1" among each of elements configuring the frontmost output data in FIG. 3 is obtained. In this case, the PE controlling part 60 instructs the weight processing part 61 to read out the weight group 511. Similarly, the PE controlling part instructs the input data processing part 62 to read out the corresponding input data 611.

When the weight processing part 61 and the input data processing part 62 complete obtaining of data, the PE controlling part 60 provides the weight processing part 61, the input data processing part 62 and the multiplication/add-up part 63 with an instruction for "convolution computation execution start" (step S03).

The weight processing part 61 and the input data processing part 62 which have received the instruction respectively output data required for the convolution computation (weight elements, input data elements) to the multiplication/add-up part 63.

The multiplication/add-up part 63 executes a cumulative summation process of the convolution computation with data provided from the weight processing part 61 and the input data processing part 62 (step S04). Herein, detail actions by the multiplication/add-up part 63 will be described later on.

The weight processing part 61 and the input data processing part serially repeat providing of the read-out data to the multiplication/add-up part 63. In addition, the multiplication/add-up part 63 repeats the cumulative summation process using the provided data. When the weight processing part 61 and the input data processing part 62 provide all read out data to the multiplication/add-up part 63, they notify the PE controlling part 60 of such fact.

The PE controlling part 60 that received the notice instructs the multiplication/add-up part 63 to output convolution computation results to the computation result storage part 53 (convolution computation result output instruction; step S05).

As a response to the instruction, the multiplication/add-up part 63 executes a process of outputting the convolution computation result (step S06). Herein, detail actions in this step by the multiplication/add-up part 63 will be described later on.

Subsequently, the multiplication/add-up part 63 stores the convolution computation result (convolution computation result of one round) in the computation result storage part 53. In addition, the multiplication/add-up part 63 notifies the PE controlling part 60 of storing of the convolution computation result in the computation result storage part 53.

The PE controlling part 60 that has received the notice determines whether or not the convolution computation using the weight group read out by the weight processing part 61 is completed (step S07). For example, in the above described example, if weight group 511 is read out, it will be determined whether or not all convolution computations with weight group 511 are completed.

In a case that all convolution computations using the read out weight group are not completed (if any input data to be convoluted using the weight group remains; step S07, branching to No), the PE controlling part 60 returns to step S02 and continues the process. During this process, the PE controlling part 60 instructs the input data processing part 62 to read out the input data while designating a pertinent range [one to another] (instructs to read out the input data while moving the sliding window).

In a case where all convolution computations using the read out weight group are completed (step S07, branching to Yes), the PE controlling part 60 determines whether or not the convolution computations using all weight groups are completed (step S08).

In a case where any weight group required to be subjected to the convolution computation remains (step S08, branching to No), the PE controlling part 60 returns to step S01 and continues the process. During this process, the PE controlling part 60 designates the next weight group and executes convolution computation using the next weight group.

In a case where no weight group required to be subjected to the convolution computation remains (step S08, branching to Yes), the PE controlling part 60 finishes the process.

When the PE controlling part 60 finishes the convolution computations, the PE controlling part 60 notifies the convolutional layer controlling part 40 of the finish. The convolutional layer controlling part 40 received the notice determines the computation in own layer is finished and notify a layer (activation function) of the fact of finish.

Next, detail of the multiplication/add-up part 63 will be explained.

As described above, the multiplication/add-up part 63 is a processing module configured to execute the convolution computation. Herein, the calculation formula may be expressed by the following formula (1).

$$a_{x,y,k}^{n+1} = \sum_{c=1}^{C} \sum_{j=1}^{R} \sum_{i=1}^{S} \left( w_{i,j,c,k} * a_{(x-\lceil \frac{S}{2} \rceil+i),(y-\lceil \frac{R}{2} \rceil+j),c}^{n} \right) \quad \text{[formula 1]}$$

In formula (1), w represents the weight element, and a represents the input data (activation) element. n represents the order of the layers, and suffixes i, j represent positions of the input data and weight in the width direction and the height direction. x, y represent positions of the output data. C, S, R represent channel number, weight size as described above.

The formula (1) may be modified to the following formula (2) by using variable values to the input data (activation) element and total sum of the weight elements corresponding to the variable values.

$$a_{x,y,k}^{n+1} = \{\sum_{c=1}^{C} \sum_{j=1}^{R} \sum_{i=1}^{S} (w_{i,j,c,k}^{1==0}) * 0\} + \\ \{\sum_{c=1}^{C} \sum_{j=1}^{R} \sum_{i=1}^{S} (w_{i,j,c,k}^{1}) = 1)\} + \quad \text{[formula 2]}$$

In formula (2), right shoulder (superscript) of the weight element w indicates the corresponding input data element value. For example, $w^{a==0}$ indicates that the input data element value "0" corresponds to weight element w.

Referring to formula (2), it is indicated that the convolution computation may be executed by calculating a total summation (cumulative sum value) relating to weight elements for each of the variable values of the input data elements, executing multiplication of the weight elements with the variable values of each of the input data, and then adding up them.

In the explanation hereinafter, element values consisting the input data are referred to as "input data value(s)", and element value consisting the weight are referred to as "weight value(s)". In addition, values which may be varied as the element values of the input data (element values consisting the input data) are referred to as "variable input data value(s)" and the total summation (total sum) of the weight elements is referred to as "total sum of weights", respectively.

The multiplication/add-up part 63 of the first exemplary embodiment executes convolution computation by using the calculation represented by formula (2). That is, the multiplication/add-up part 63 cumulatively adds up weight elements to be multiplied to input data elements for each of variable values of input data elements in one round of convolution computation. After that, the multiplication/add-up part 63 multiplies each of the variable values of input data elements with each of cumulative sum values of weights corresponding to the variable values of input data elements. Finally, the multiplication/add-up part 63 adds up the plurality of multiplication results obtained by the multiplication so as to obtain a convolution computation result.

In the first exemplary embodiment, it is assumed that each element consisting the input data is expressed by 4 bits in size. For example, values ranging from 0 to 15 are the variable input data values. Herein, as far as an input data element may be expressed by 4 bits, the variable input data value may be a negative value, but not limited to a positive value. For example, the variable input data value may be an integer within a range from −7 to 7. Or, the input data element value may be a value expressed by a floating point, but not an integer. Herein, it is of course the input data element is not limited to 4 bits in size. The input data element values may be values less than 4 bits and may be values larger than 4 bits.

Figure 8:
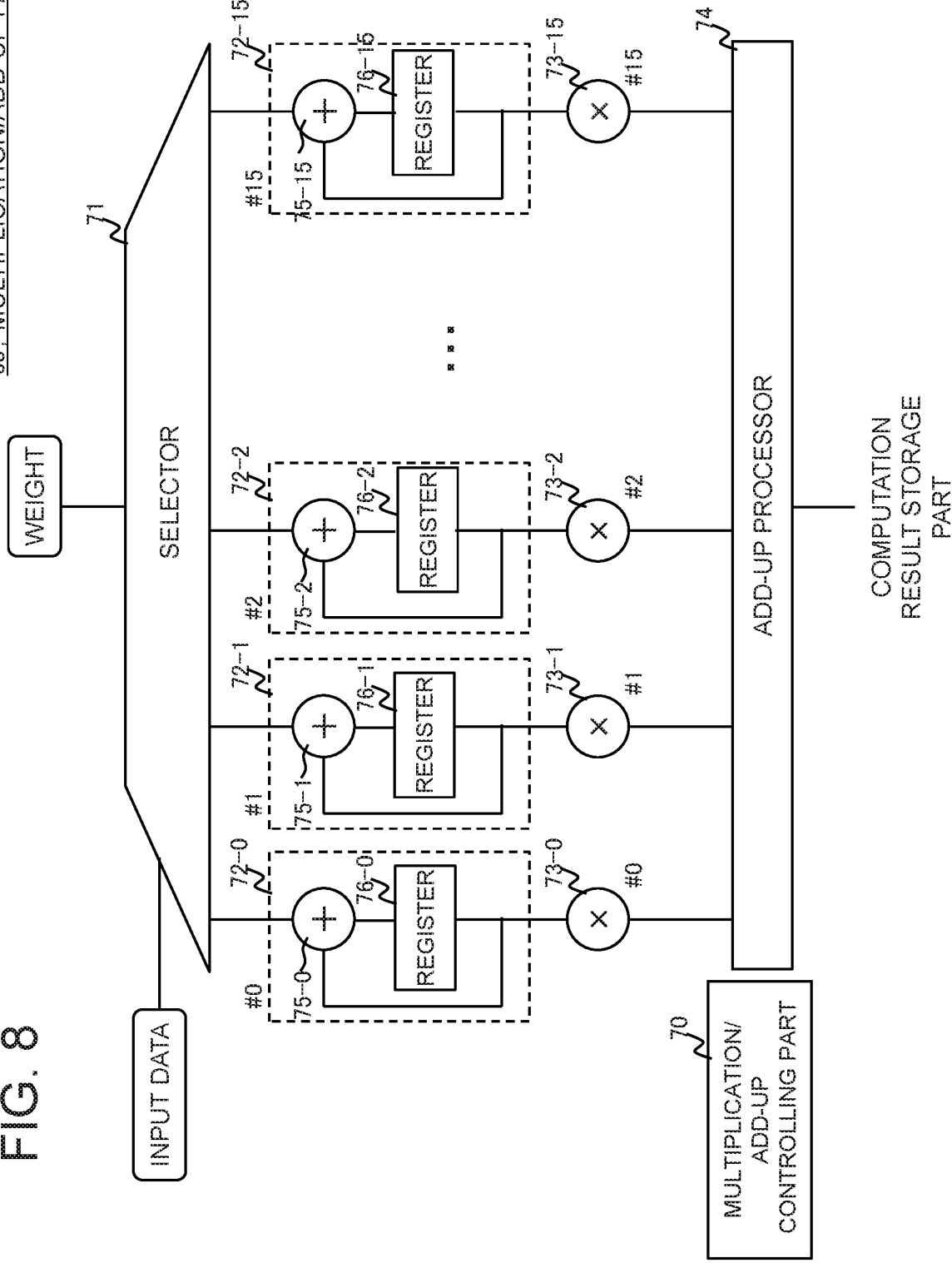
FIG. 8 is a diagram showing one example of inner configuration of the multiplication/add-up part of the first exemplary embodiment.

FIG. 8 is a diagram showing one example of inner configuration of the multiplication/add-up part 63. Referring to FIG. 8, the multiplication/add-up part 63 is configured by comprising a multiplication/add-up controlling part 70, a selector 71, a plurality of accumulation processors (accumulators) 72-0 to 72-15, a plurality of multipliers 73-0 to 73-15 and an add-up processor (accumulator) 74.

In the explanation hereinafter, in a case where there is no specific reason to discriminate the accumulation processors 72-0 to 72-15, they are referred to as "accumulation processor 72" simply. Similarly, the other components are also expressed by a numerical value at the front of hyphen as a representative component.

The selector 71 is input (receives) the input data elements and the weight elements. In addition, the selector 71 determines an accumulation processor 72 to be output destination of the input weight elements among the plurality of accumulation processors 72 depending on an obtained input data element value.

Each of the plurality of accumulation processors 72 calculates cumulative sum of the weights (total sum of the weights) for each of the variable values of input data elements and stores it.

Each of the plurality of multiplier 73 is arranged in association with each of the plurality of accumulation processor 72, respectively.

The accumulation processor 72 and the multiplier 73 are arranged for each of variable values of the input data (activation). As described above, in a case where each element of the input data is expressed by 4 bits in size, for example, the variable input data value is from 0 to 15. Accordingly, 16 accumulation processors 72 and multipliers 73, each of them is associated with each data, are configured in the multiplication/add-up part 63.

In FIG. 8, numerical values with a symbol #illustrated near the accumulation processor 72 and the multiplier 73 indicate the variable input data values. For example, the accumulation processor 72-1 is a processor for storing total sum of corresponding weights in a case where the value of the input data is "1". In addition, the multipliers 73-1 is a processor for executing multiplication of a value held by the accumulation processor 72-1 with the value "1" of the corresponding input data. As described above, a cumulative sum value of weights and a value to be multiplied are previously assigned to the plurality of multiplier 73.

Each accumulation processor 72 comprises an add-up processor 75 and a register 76.

The add-up processor 74 inputs multiplication results by the plurality of multiplier 73 and add up the multiplication results.

The multiplication/add-up controlling part 70 controls each module in the multiplication/add-up part 63 as a response to instruction from the PE controlling part 60. More concretely, the multiplication/add-up controlling part 70 initialize the accumulation processor 72 (sets the registers 76 to 0) upon receiving an instruction for "convolution computation start" from the PE controlling part 60.

In addition, the multiplication/add-up controlling part 70 calculates multiplication results of the values held by the accumulation processor 72 with the variable input data value (a predetermined value) using the multiplier 73 when it receives instruction for "convolution computation result output" from the PE controlling part 60. Then, the multiplication/add-up controlling part 70 adds up the calculation results of each of the multipliers 73 using the add-up processor 74 so as to provide a convolution computation result. The calculation result by the add-up processor 74 is stored in the computation result storage part 53.

Figure 9:
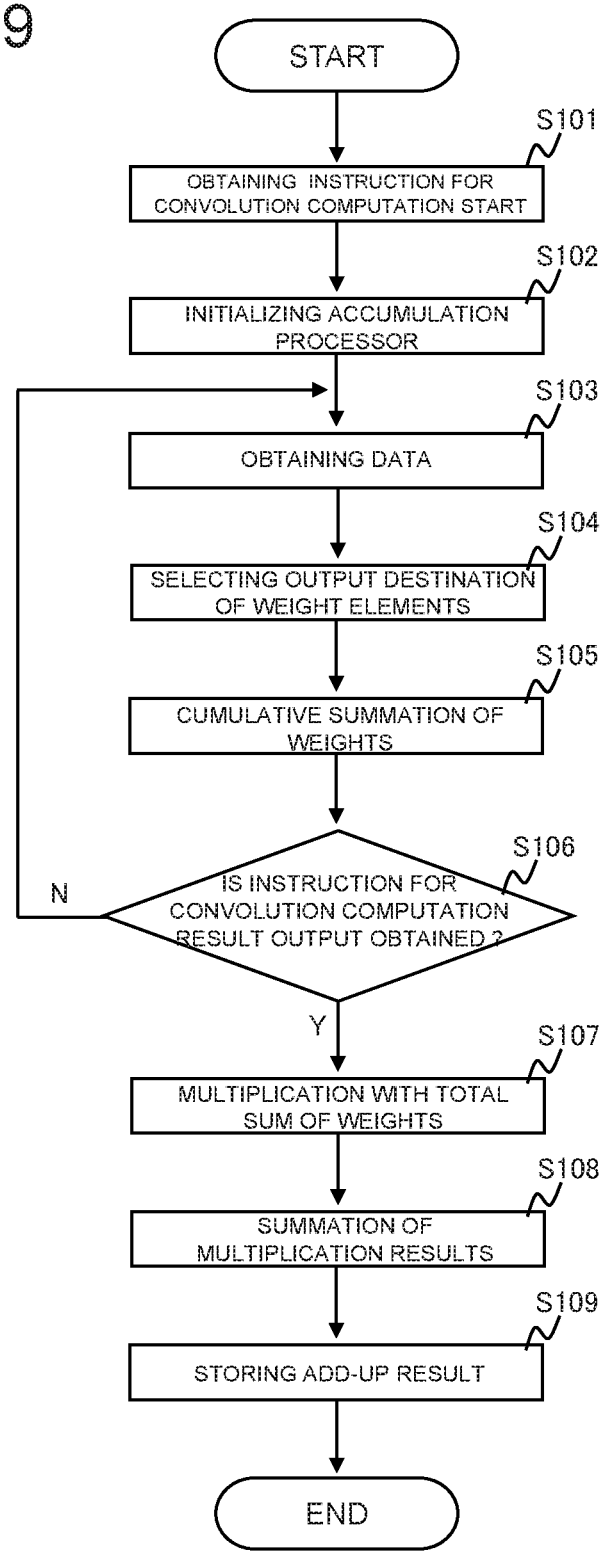
FIG. 9 is a flowchart showing one example of actions by the multiplication/add-up part of the first exemplary embodiment.

Next, referring to FIG. 9, actions by the multiplication/add-up part 63 will be explained.

The multiplication/add-up controlling part 70 obtains an instruction for "convolution computation start" from the PE controlling part 60 (step S101).

Upon receiving the instruction, the multiplication/add-up controlling part 70 initializes the accumulation processor 72 (step S102).

The selector 71 obtains weight elements and input data elements from the weight processing part 61 and the input data processing part 62 (obtaining data; step S103).

The selector 71 selects an accumulation processor 72, to be an output destination of the weight element, depending on the obtained input data value, and outputs the weight element (step S104). For example, in a case where the value of the obtained input data is "1", the selector 71 outputs obtained weight element to the accumulation processor 72-1.

When obtaining the weight elements from the selector 71, the accumulation processor 72 adds the weight element values to the values stored in the register 76 (cumulative summation of weights; step S105).

The multiplication/add-up controlling part 70 confirms whether or not it obtains an instruction for "convolution computation result output" from the PE controlling part 60 (step S106).

In a case of not obtaining the instruction (step S106, branching to No), the multiplication/add-up controlling part 70 returns to step S103 and repeats the processes for the cumulative summation of the weights. That is, the multiplication/add-up part 63 calculates the total sum of weights for each of the variable input data values until it obtains the instruction for the "convolution computation result output" from the PE controlling part 60.

In a case of obtaining the instruction for "convolution computation result output" (step S106, branching to Yes), the multiplication/add-up controlling part 70 executes processes of step S107 and the followings.

When obtaining the instruction for "convolution computation result output", the multiplication/add-up controlling part 70 causes the multiplier 73 to execute multiplication processes of the value held by each of the accumulation processor 72 with the value assigned to the corresponding multiplier 73 (variable input data values) (multiplication with the total sum of the weights; step S107). For example, the multiplier 73-1 calculates multiplication of the value held by the accumulation processor 72-1 with the value "1" assigned to the multiplier 73-1.

After that, the multiplication/add-up controlling part 70 causes the add-up processor 74 to calculate add-up result (total sum) of the multiplication results by each of the multiplier 73 (step S108). The add-up result by the add-up processor 74 is a result of one round of convolution computation.

The add-up processor 74 stores the add-up result in the computation result storage part 53 (step S109).

Next, actions by the multiplication/add-up part 63 will be concretely explained by way of an example of convolution computation with the weight group 511 and the corresponding input data 611 as illustrated in FIG. 3.

First, the multiplication/add-up part 63 obtains an element value "1" at upper left corner of the input data 601 and a corresponding weight value "1". In such case, since the input data value is "1", the selector 71 selects the accumulation processor 72-1 and outputs the weight value "1". The accumulation processor 72-1 adds the weight value "1" to the value held by the register 76-1 (which is 0, since just after initialization)" and store it in the register 76-1.

Then, the multiplication/add-up part 63 obtains element value "2" at upper middle position in the input data 601 and the corresponding weight value "1". In such case, since the input data value is "2", the selector 71 selects the accumulation processor 72-2 and outputs the weight value "1". The accumulation processor 72-2 adds the weight value "1" to the value held by the register 76-2 (which is 0, since just after initialization) and store it in the register 76-2.

Then the multiplication/add-up part 63 obtains the element value "1" at upper right position in the input data 601 and the corresponding weight value "2". In such case, since the input data is "1", the selector 71 selects the accumulation processor 72-1 and outputs the weight value "2". The accumulation processor 72-1 adds the weight value "2" to the value "1" held by the register 76-1 and store it in the register 76-1.

The multiplication/add-up part 63 repeats such add-up process relating to the weights for each of the variable input data values. As a result of the add-up process, total sum of the weight values corresponding to each variable input data value is stored in each of the accumulation processor 72. After that, the multiplication/add-up part 63 multiplies the value held by each accumulation processor 72 with a corresponding value (variable input data value) and adds up the multiplication results so as to determine a convolution computation result.

As described above, the multiplication/add-up part 63 of the first exemplary embodiment calculates a total sum relating to the weight values for each variable input data value. After that the multiplication/add-up part 63 multiplies the variable input data value with the total sum of the corresponding weight values and adds up each multiplication result so as to determine one round of convolution computation result. By virtue of such configuration, the number of multiplications required for convolution computation may be reduced.

For example, now assume that a convolution computation be performed with the weight group 511 and the input data 611 as illustrated in FIG. 3. First, to be considered is the number of multiplications in a calculation method in which the input data element is multiplied with the corresponding weight elements, and then the multiplication results are added up. In such case, since the size of each weight included in the weight group 511 is 9 (3×3), the number of multiplications required for convolution computation with the input data 601 and the weight 501 is 9. In addition, the multiplications of the input data with the weights are executed for each channel, thus in a case of the channel number C being "3", 9×3=27 times of multiplications are required.

In contrast, as to the multiplication/add-up part 63 of the first exemplary embodiment, calculation of the total sum of the weights is executed first, and then calculation of multiplication of this total sum with the variable input data values is executed. Thus, in a case where each of element values of the input data is expressed by 4 bits, only 16 times of multiplications are required. Furthermore, the number of multiplications is 16 irrespective of the channel number C as a calculation target of the multiplication/add-up part 63.

As described above, the multiplication/add-up part 63 of the first exemplary embodiment can execute the convolution computation by a reduced number of multiplications.

In addition, if the variable input data values are limited (if each element of the input data is expressed by low bits), the reduction effect in the multiplication number is more significant. For example, in a case where each element of the input data is expressed by 2 bits in size, the total sum of the weight values is multiplied with the variable input data values (for example, 0, 1, 2, 3), thus the convolution computation may be executed by 4 times of multiplication processes.

Furthermore, the technology disclosed in Non-Patent Literature 1 requires that each element value of the weight is expressed by low bits, whereas the multiplication/add-up part 63 of the first exemplary embodiment has no such limitation.

Moreover, the technology disclosed in Non-Patent Literature 1 has a problem that bit width is extended in an add-up processor which successively adds up the multiplication results of the weight with the input data (input data expanded to power-of-two representation). For example, assume a case in which each element of the weight be 4 bits in size, each element in the input data be 8 bits in size, and these data be multiplied by 512 ($2^9$) times. In such case, add-up processors having a bit width of 4+8+9=21 are required.

In contrast, in the first exemplary embodiment, since the registers 76 are arranged for each of the variable input data values, thus the bit width of the add-up processor 75 included in the accumulation processor 72 is 8+9=17 bits. Accordingly, the multiplication/add-up part 63 of the first exemplary embodiment can execute convolution computation using an add-up processor having a lower bit width.

Second Exemplary Embodiment

Next, a second exemplary embodiment will be explained in more detail referring to drawings.

In the first exemplary embodiment, total sum of the weight values is calculated for each of the variable values of the input data. Therefore, it is required to prepare an accumulation processor 72 and a multiplier 73 for each of the variable values of the input data. For example, in a case where an element value in the input data is expressed by 4 bits in size, 16 accumulation processors and 16 multipliers are required.

In the second exemplary embodiment, there is a presupposition that the input data has been logarithmically quantized. That is, the input data storage part 52 stores the input data which has been logarithmically quantized. In the second exemplary embodiment, a multiplication/add-up part under the presupposition will be explained, in which the number of the accumulation processors and the multipliers is reduced.

In the second exemplary embodiment, as disclosed in Non-Patent Literature 4, assumed is a case where each element of the input data (activation) has been logarithmically quantized into 4 bits in size. More concretely, the values of the input data have been rounded (transformed) to a power-of-two representation, and each element of the logarithmically quantized input data stores a power exponent of the power-of-two representation. For example, in a case where a data value as a logarithmic quantization target is "8", the data value may be expressed by $2^3$, thus the logarithmically quantized data is "3". By virtue of such logarithmic quantization process, the element values of the logarithmically quantized input data represent shift amount (level)s in the weights.

Herein, in the logarithmic quantization disclosed in Non-Patent Literature 4, a target value for logarithmic quantization is transformed to a predetermined minimum value in a case where the target value is less than a threshold value, whereas the target value is converted to a predetermined maximum value in a case where the target value is larger than the threshold value. Further, in the logarithmic quantization, a logarithm is calculated in a case where the target value is within a range defined by the predetermined minimum value and the predetermined maximum value. It is assumed that, the similar process is also executed in the present application.

The multiplication/add-up part 63a has a configuration that separates elements of the logarithmically quantized input data to high-significant bits and low-significant bits, shifts the weight value according to the values of the separated low-significant bits, and selects an output destination of the weight value which have been subjected to the shift operation according to the values of the separated high-significant bits.

Figure 10:
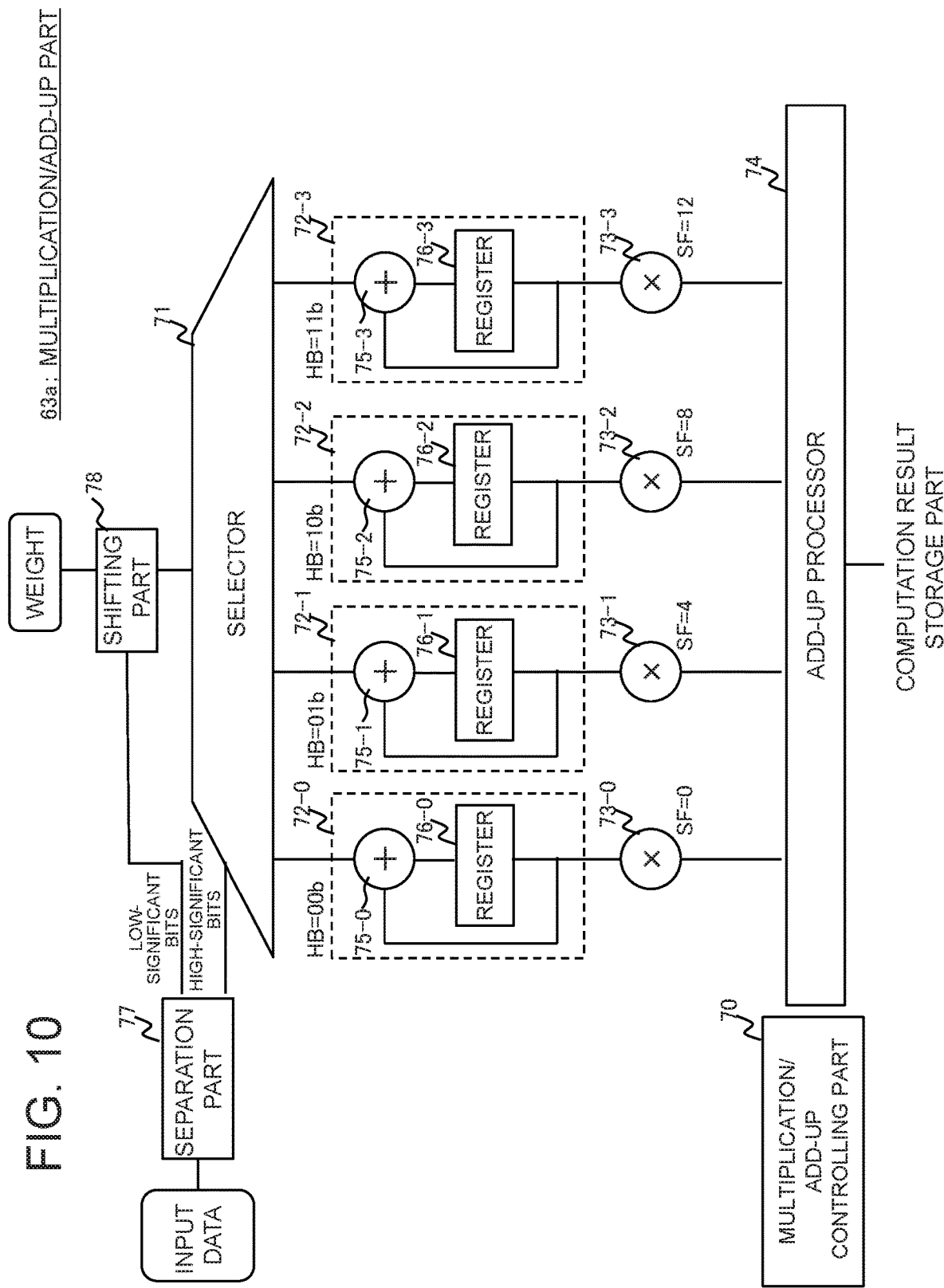
FIG. 10 is a diagram showing one example of inner configuration of the multiplication/add-up part of the second exemplary embodiment.

FIG. 10 is a diagram showing an example of inner configuration of the multiplication/add-up part 63a of the second exemplary embodiment. Referring to FIG. 10, the multiplication/add-up part 63a further comprises a separation part 77 and a shifting part 78.

The separation part 77 is a means for factorization of the input data elements and separating them into a previously determined first factor group and second factor group. More concretely, the separation part 77 separates the elements of the logarithmically quantized input data to the first factor group or the second factor group. The first factor group refers to values whose elements (factors) are bit values at higher-significant positions rather than a predetermined bit position within bit positions of the input data. The second factor group refers to values whose elements (factors) are bit values at lower-significant positions rather than the predetermined bit position within bit positions of the input data. In explanation hereinafter, the first factor group is referred to as "high-significant bits" and the second factor group is referred to as "low-significant bits".

The separation part 77 provides the separated high-significant bits to the selector 71. The separation part 77 provides the low-significant bits to the shifting part 78.

For example, the separation part 77 separates a value of the logarithmically quantized input data, which is expressed by 4 bits, to 2 bits of high-significant and 2 bits of low-significant. For example, in a case where the input data is "3", the high-significant bits are "00b", and the low-significant bits are "11b". Similarly, in a case where the input data is "15", the high-significant bits are "11b", and the low-significant bits are "11b". Note that, in the present disclosure, in a case where a numerical value is expressed by a binary number, "b" is appended after the numerical value.

The number of the accumulation processors 72 and the multiplier 73 required for the multiplication/add-up part 63a is equal to a number represented by a number, in which base (cardinal number) is "2" and power index is the number (size) of bits of the separated high-significant bits. For example, as described above, in a case where a value of the input data is separated to high-significant 2 bits (in size) and low-significant 2 bits (in size), 4 ($=2^2$) accumulation processors 72 and multipliers 73 are required.

The accumulation processor 72 is arranged for each of the variable values of the value of the high-significant bits and stores a cumulative sum value of the weight values (shifted weight values, as described later on) according to the value of the high-significant bits. For example, an accumulation processor 72-0 stores total sum of weight values in a case where the value of the high-significant bits is "00b".

Each multiplier 73 is configured to shift left the value held by the associated accumulation processor 72 by a predetermined shift amount (level). For example, they are configured such that, a multiplier 73-0 does not execute such shift (the left shift amount (level) is 0), a multiplier 73-1 executes such shift by 4 bits, a multiplier 73-2 executes such shift by 8 bits, and a multiplier 73-3 executes such shift by 12 bits.

The shift amount (level) by the multiplier 73 is a value obtained in a manner where, with respect to the input data separated to the high-significant bits and the low-significant bits, the low-significant bits are fixed at zero and the high-significant bits are a variable. Concretely, shift amount (level)s of "0000b=0", "0100b=4", "1000b=8" and "1100b=12" may be assigned to each multiplier 73.

Herein, in FIG. 10, "HB (High Bit)" indicated near the accumulation processor 72 refers to the value of corresponding high-significant bits and "SF" indicated near the multiplier 73 refers to the shift amount (level).

The shifting part 78 shifts element value of the obtained weight by a bit number equal to the value of the low-significant bits. More concretely, the shifting part 78 subjects the value of the obtained weight to shift operation depending on separated low-significant bits which is provided from the separation part 77, and outputs a result to the selector 71. For example, in a case where the value of the obtained low-significant bits is "11b", the shifting part 78 outputs to the selector 71 a result obtained by shifting left the obtained weight values by 3 bits.

As described above, the selector 71 determines an output destination of the weight element (weight element subjected to shift operation) according to the value of the high-significant bits. More concretely, for example, in a case where the value of the obtained high-significant bits is "11b", the selector 71 outputs the obtained weight value to the accumulation processor 72-3.

Actions by the multiplication/add-up controlling part 70, the accumulation processor 72, the multiplier 73 and the add-up processor 74 may be the same as their actions explained in the first exemplary embodiment, thus further explanation is omitted.

Next, actions by the multiplication/add-up part 63a will be concretely explained.

For example, in a case where the value of the input data is "3", the values of the high-significant bits are "00b" and the values of the low-significant bits are "11b". Therefore, the shifting part 78 is provided with "11b", and the shifting part 78 shifts left the obtained weight values by 3 bits. In addition, the selector 71 is provided with the high-significant bits "00b", thus the selector 71 outputs the weight value provided from the shifting part 78 (the weight value shifted left by 3 bits) to the accumulation processor 72-0. The accumulation processor 72-0 adds the weight value shifted left by 3 bits to a value held by the register 76-0 and stores it in the register 76-0.

When the total sum of the all of the weight values is calculated, the value held by the accumulation processor 72-0 is subjected to shift operation by the multiplier 73-0. In such case, since the multiplier 73-0 does not execute the shift operation, the value held by the accumulation processor 72-0 is output to the add-up processor 74 as just it is. As apparent from this case, in a case where the value of the input data is "3", the corresponding weight value is shifted left by 3 bits and then output to the add-up processor 74.

Next, considered is a case where the value of the input data is "15". In such case, the values of the high-significant bits are "11b" and the values of the low-significant bits are "11b". Therefore, the shifting part 78 is provided with "11b", thus the shifting part 78 shifts left the obtained weight value by 3 bits. In addition, the selector 71 is provided with the high-significant bits "11b", thus the selector 71 outputs the weight value provided from the shifting part 78 (the weight value shifted left by 3 bits) to the accumulation processor 72-3. The accumulation processor 72-3 adds the weight value shifted left by 3 bits to the value held by the register 76-3 and store it in the register 76-3.

When the total sum of the all of the weight values is calculated, the value held by the accumulation processor 72-3 is subjected to shift operation by the multiplier 73-3. In such case, since the multiplier 73-3 is configured to execute left shift operation by 12 bits, thus the value held by the accumulation processor 72-3 is output to the add-up processor 74 in a state shifted left by 12 bits. As apparent from this case, in a case where the value of the input data is "15", the corresponding weight value is shifted left by 12 bits and then output to the add-up processor 74.

Herein, it is required to discriminate a case where the shift amount (level) is "0" and a case where the element value is truly "0" in the logarithmically quantized input data. Therefore, in addition to the 4 bits described above, at least 1 bit is required. Accordingly, in order to logarithmically quantize the input data to 4 bits, 4 bits (shift amount (level))+1 bit (whether truly 0 or not) are required. However, in the explanation above, the 1 bit indicating true "0" is not taken into consideration for easy understanding. In a case where the 1 bit is taken into consideration, when the value of the input data indicates true "0", the multiplication/add-up part 63a may execute a process for discarding the value of the corresponding weight and the like. It is because, in a case where the value of the input data is true "0", the multiplication result is "0" without being affected by the value of the weight.

Accordingly, in the second exemplary embodiment, in a case where the input data has been logarithmically quantized, the value of the logarithmically quantized input data is separated to the high-significant bits and the low-significant bits, and the shift operation corresponding to the value of the low-significant bits is preliminarily executed in the shifting part 78. Further, the selector 71 determines output destination of the value of the weights which has been subjected to shift operation based on the value of the high-significant bits, and shift operation corresponding to the value of the high-significant bits is executed in the multiplier 73 connected to each accumulation processor 72. As a result, in the second exemplary embodiment, the number of the accumulation processors 72 and the multipliers 73 required for the multiplication/add-up part 63a may be reduced.

For example, as described above, in a case where the input data which has been logarithmically quantized to 4 bits is separated to high-significant 2 bits and low-significant 2 bits, required number of the accumulation processors 72 and the like is "4". In addition, in a case where the input data which has been logarithmically quantized to 4 bits is separated to high-significant 3 bits and low-significant 1 bit, required number of the accumulation processors 72 and the like is "8". Further, in a case where the input data which has been logarithmically quantized to 4 bits is separated to high-significant 1 bit and low-significant 3 bits, required number of the accumulation processors 72 and the like is "2". That is, in a case where the input data which has been logarithmically quantized to 4 bits is separated to high-significant B1 bit(s) and low-significant B2 bit(s), the required number of the accumulation processors 72 and the like is reduced to $\frac{1}{2}^{B2}$. In a case where the required number of the accumulation processors 72 and the like is reduced, the area and complexity of a mounted circuit in the multiplication/add-up part 63a may be reduced.

Third Exemplary Embodiment

Next, a third exemplary embodiment will be explained in more detail referring to drawings.

In the first and second exemplary embodiments, the add-up processor 75 is arranged for each of the accumulation processors 72. In the third exemplary embodiment, a case will be explained, where the add-up processor is shared.

Figure 11:
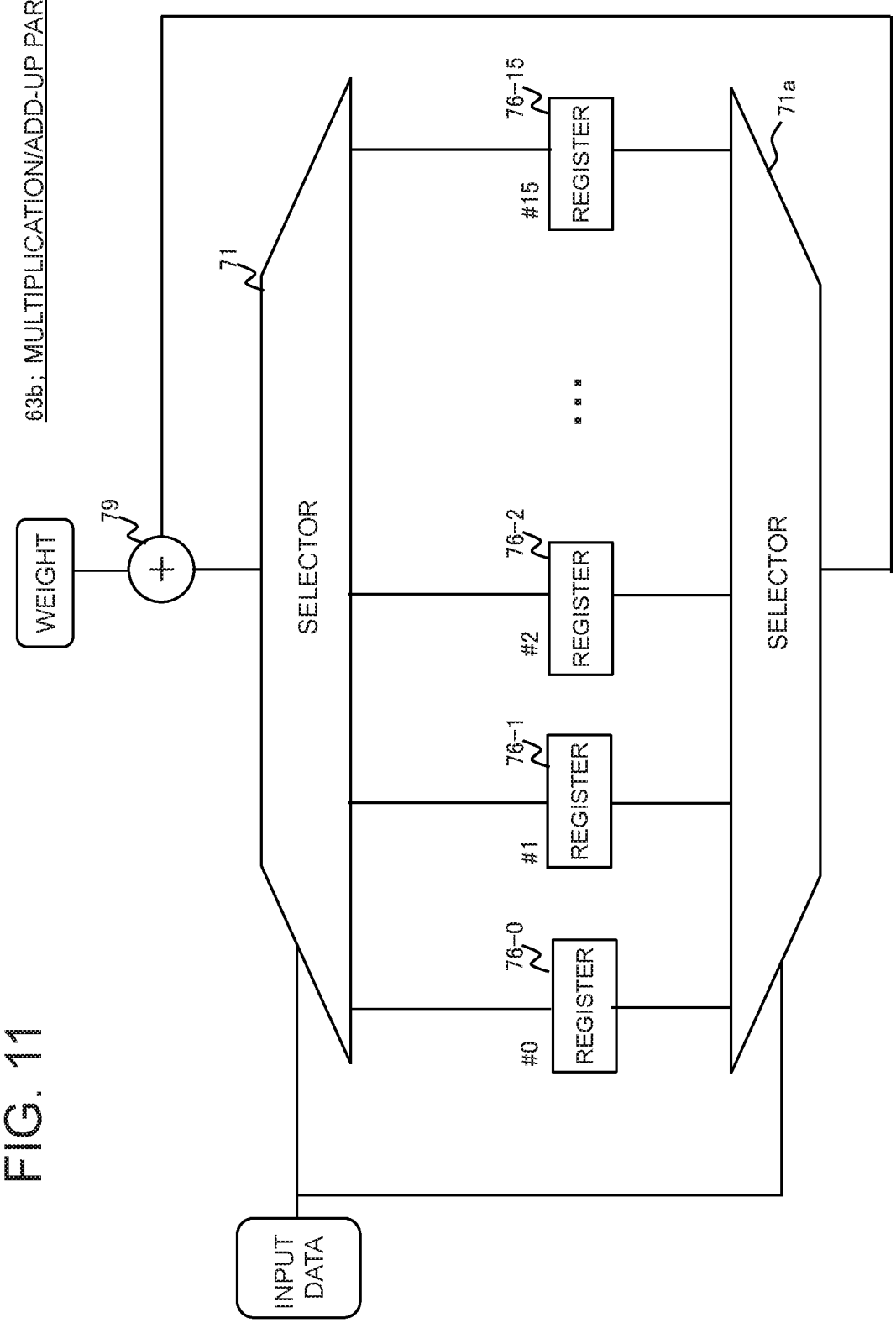
FIG. 11 is a diagram showing one example of inner configuration of the multiplication/add-up part of the third exemplary embodiment.

FIG. 11 is a diagram showing an example of inner configuration of the multiplication/add-up part 63b of the third exemplary embodiment. Referring to FIG. 11, the multiplication/add-up part 63b further comprises a selector 71a and an add-up processor 79. In addition, the add-up processor 75 is removed from each accumulation processor 72 explained in the first and second exemplary embodiments, the accumulation processor 72 is replaced with the register 76. In FIG. 11, the multiplication/add-up controlling part 70, the multiplier 73 and the add-up processor 74 are omitted in the illustration.

The selector 71a is a cumulative sum value selector which selects output of an accumulation processor among a plurality of accumulation processors (registers 76) based on the variable values of the input data element. That is, the selector 71a selects and outputs any one value held by each register 76 based on the input data value. For example, in a case where the input data value is "0", the selector 71a selects the register 76-0 and outputs the value held by itself to the add-up processor 79.

The add-up processor 79 is a shared add-up processor which adds the values output from the selector 71a to the element values of the weights and outputs the summation result to the selector 71.

The selector 71 switches over output destination of the value(s) obtained based on the values of the input data (the summation result by the add-up processor 79).

Accordingly, in the third exemplary embodiment, the value(s) to be read out from the register 76 is selected based on the value of the input data, and the value read out, which has been held by the register 76, is added to the value of the weight. In addition in this exemplary embodiment, a register 76 to be output destination of the selector 71 is selected based on the value of the input data, and total sum of the values of the weights for each of the variable values of the input data (cumulative sum value of the weights) is calculated. That is, the add-up processors 75 which are arranged for each of the accumulation processors 72 in the first and second exemplary embodiments may be reduced. As a result, the area of a mounted circuit in the multiplication/add-up part 63b may be reduced.

Next, a hardware configuration of the inference device 10 of the first to third exemplary embodiments will be explained.

Figure 12:
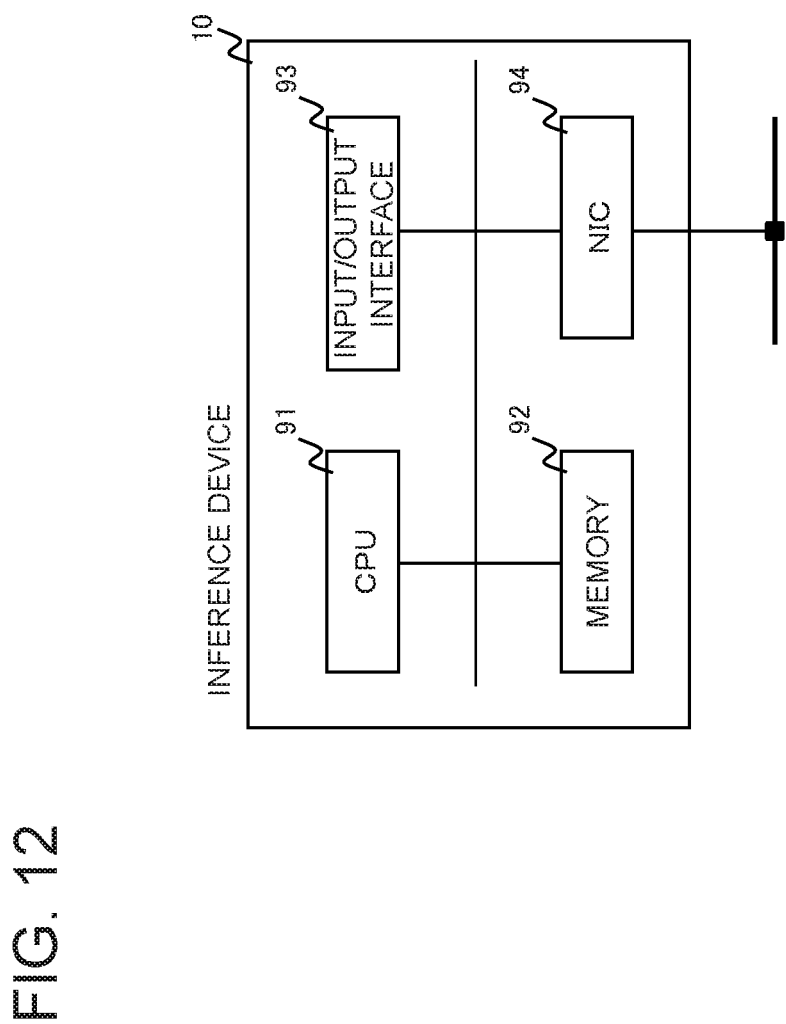
FIG. 12 is a diagram showing one example of hardware configuration of the inference device.

FIG. 12 is a diagram showing an example of a hardware configuration of the inference device 10. The inference device 10 may be configured by, so called, an information processing apparatus (computer), and has a configuration exemplified in FIG. 12. For example, the inference device 10 comprises CPU (Central Processing Unit) 91, a memory 92, an input/output interface 93, NIC (Network Interface Card) 94 as a communication means, etc., which are mutually connected with an inner bus.

Herein, it is not intended to limit the hardware configuration of the inference device 10 by the configuration illustrated in FIG. 12. The inference device 10 may comprise a hardware which is not shown. Or, it is also not intended to limit the number of CPU and the like mounted in the inference device 10 to the exemplification in FIG. 12, thus for example, a plurality of CPUs may be mounted in the inference device 10.

The memory 92 is RAM (Random Access Memory), ROM (Read Only Memory) or an auxiliary storage apparatus (such as a hard disk).

The input/output interface 93 is a means as an interface of a display apparatus and an input apparatus which are not shown. The display apparatus is, for example, a liquid crystal display, etc. The input apparatus is, for example, an apparatus for receiving user operation, such as a keyboard or mouse.

Functions of the inference device 10 are realized by the above processing module. The processing module is realized in such a manner that, for example, CPU 91 executes program stored in the memory 92. A part of the processing module (for example, the PE 41 or the multiplication/add-up part 63 configured in it) may be realized by a hardware (implemented in a hardware) dedicated to specific applications, such as FPGA (Field Programmable Gate Array) or ASIC (Application Specific Integrated Circuit). In addition, the above program may be downloaded via a network or updated using a storage medium which stores the program. Further, the processing module may be realized by a semiconductor chip. That is, the functions exerted by the processing module may be realized by executing software on some kind of hardware.

[Variations]

The inference devices 10 explained in the first to third exemplary embodiments are examples, but not intended to limit their configurations and actions. A variety of variations will be explained below.

Figure 13:
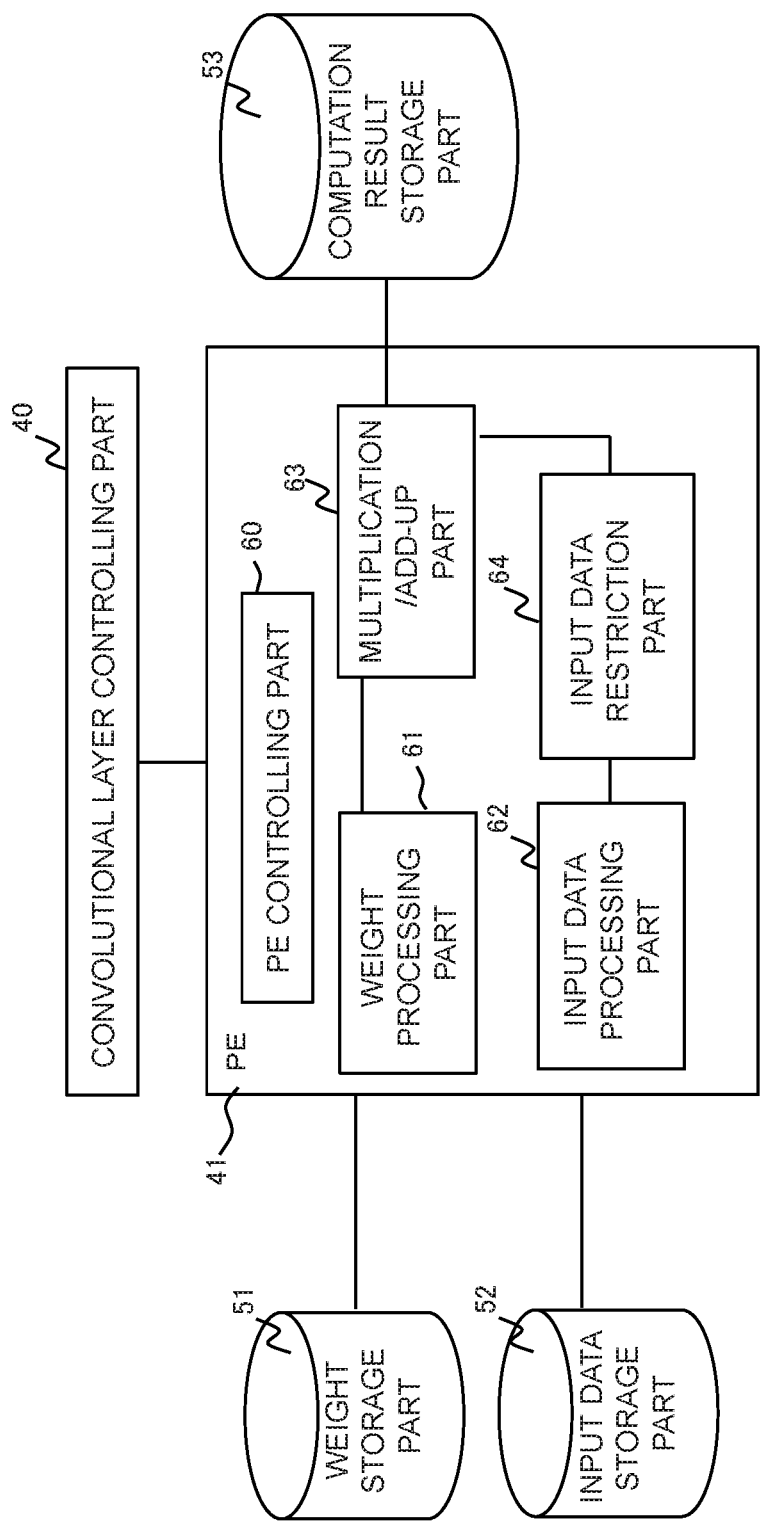
FIG. 13 is a diagram showing one example of another inner configuration of the convolutional layer executing part.

For example, as illustrated in FIG. 13, an input data restriction part 64 may be arranged in the PE 41. As stated above, the input data includes the less variable values, the multiplication/add-up part 63 described in the present disclosure has the more reduction effect in the multiplication process. Therefore, the variable values of the input data are restricted (converted to low bits) by the input data restriction part 64. For example, in a case where values of the input data are expressed by 4 bits or more, the input data restriction part 64 executes a process for rounding the values of the input data to a value of 4 bits. More concretely, the input data restriction part 64 may convert the values of the input data to low bits by using a Look Up Table (LUT) in which obtained data and data to be output are associated. Or, the input data restriction part 64 may convert the values of the input data to low bits by using a predetermined function.

In the above exemplary embodiments, explained are cases where computation result by the multiplication/add-up part 63 is stored in the computation result storage part 53 as it is. However, the result of the convolution computation may become too large depending on the input data and the weights used in the convolution computation. Concretely, in the exemplary embodiments, explained is a multiplication/add-up part 63 under a presumption that the values of the input data may be expressed by 4 bits. However, there is a case where the result of convolution computation exceeds 4 bits (occurrence of overflow in convolution computation). In a case of occurrence of overflow in convolution computation, the multiplication/add-up part 63 sets the computation result to the maximum value of the variable values (for example, 15), but not sets the computation result to "0" so that the following processes are allowed to be continued.

Figure 14:
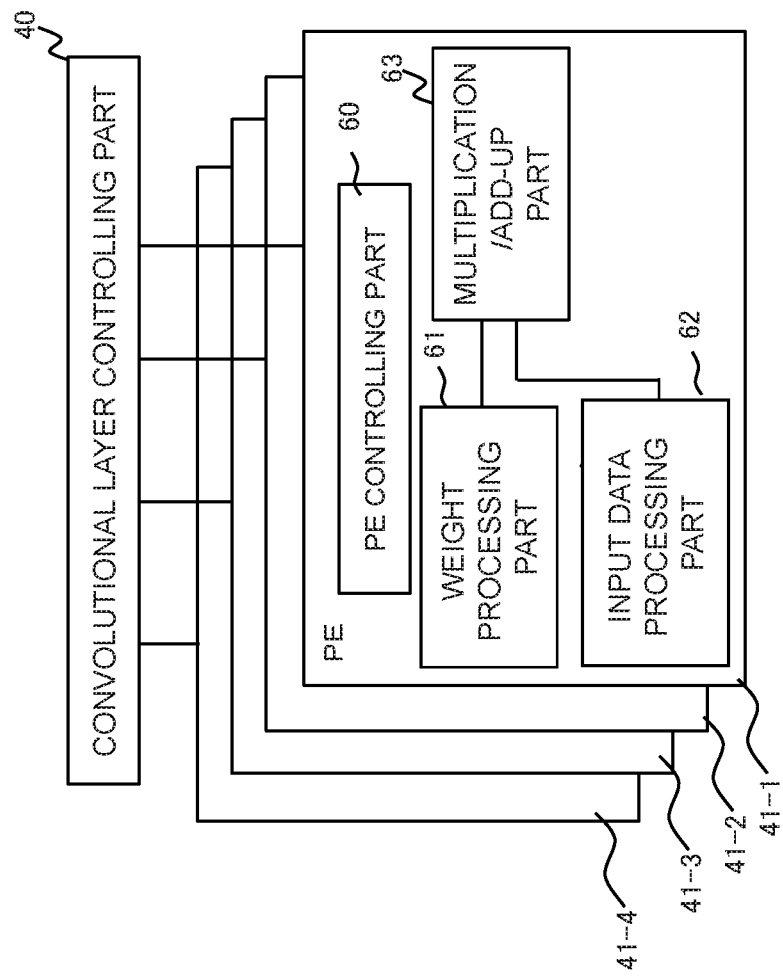
FIG. 14 is a diagram showing one example of another inner configuration of the convolutional layer executing part.

In the above exemplary embodiments, explained are configurations where one PE 41 sequentially executes one round of convolution computation, however a plurality of PE 41 may be arranged so as to execute the convolution computation in parallel. For example, as illustrated in FIG. 14, a plurality of PEs 41 having the same configuration respectively may be arranged so that each PE 41 executes the convolution computation independently. For example, referring to FIG. 3, PE 41-1 may execute convolution computation relating to the weight group 511, and another PE 41 may execute convolution computation relating to the weight group 512 simultaneously (in parallel). Or, convolution computation for one weight group may be executed in parallel. For example, a configuration may be realized, where the PE 41-1 executes convolution computation using the weights 501 in FIG. 3, the PE 41-2 executes convolution computation using the middle weights, and the PE 41-3 executes convolution computation using the weights 502 (in parallel execution). In such case, computation results by three PEs 41 may be added-up so as to obtain the final convolution computation result. Herein, in FIG. 14, a variety of storage parts are omitted in the illustration.

Considering the parallel execution of the convolution computation using a plurality of PEs 41, the effect exerted by a small bit width of the add-up processor 75 in the multiplication/add-up part 63 in the present disclosure is more significant. That is, although it is assumed that the parallel execution of convolution computation using a plurality of PEs may be realized even in the technology disclosed in Non-Patent Literature 1, an add-up processor having a large bit width would be required to be arranged, if a plurality of PEs are arranged. In contrast, the multiplication/add-up part 63 of the present disclosure requires to arrange a plurality of PEs comprising an add-up processor having a smaller bit width rather than the add-up processor disclosed in Non-Patent Literature 1, thus expansion in circuit scale may be suppressed when the convolution computation is executed in parallel.

In the above exemplary embodiments, explained are constructions comprising the accumulation processor 72 for cumulative summation of weight values corresponding to value "0" of the input data. However, such accumulation processor may be absent. Concretely, the accumulation processor 72-0 and the multiplier 73-0 in FIG. 8 may be absent. It is because multiplication result is "0" in a case where the value of the input data is "0". Or, it can be also said that, if the value of the input data is "0", the weight processing part 61 and the input data processing part 62 are not required to provide the multiplication/add-up part 63 with the value of the weight corresponding to the values of the input data. For example, the input data processing part 62 may detect that the value of the input data is "0", notify the weight processing part 61 of such fact, and omit to provide the weight value corresponding to the input data whose value is "0". Accordingly, the weight processing part 61 and the input data processing part 62 are not required to provide the selector 71 with the input data elements and the corresponding weight elements for which element value of the input data is zero. That is, in a case where the element value of the input data is "0", the input data processing part 62 and the weight processing part 61 may cooperatively stop providing the data and corresponding weight to the selector 71. As a result, it is expected that the process in the multiplication/add-up part 63 is reduced and thus the speed for convolution computation is improved.

In the above exemplary embodiments, explained are examples where the weight processing part 61 and the input data processing part 62 read out data (weight group, corresponding input data) used in one round convolution computation. However, the weight processing part 61 and the input data processing part 62 may have a configuration where they successively read out data required for convolution computation and provide it to the multiplication/add-up part 63.

In the second exemplary embodiment, explained is a case where the element values of the logarithmically quantized input data are a positive value. However, the element values of the logarithmically quantized input data may be a negative value. That is, the weights may be not only shifted left (the element values of the logarithmically quantized input data are a positive value), but also shifted right (the element values of the logarithmically quantized input data are a negative value). For example, it is meant that the value of the weight is shifted right by 2 bits upon multiplication of the value with the weight in a case where the element value of the logarithmically quantized element value is "−2". In addition, in the second exemplary embodiment, although the input data is separated to high-significant bits and low-significant bits, even in a case where the element value of the input data is a negative value (shifted right), the negative value may be applied to the multiplication/add-up part 63a indicated in FIG. 10. For example, it is considered a case of a negative value in complement notation of shift amount (level) 2. For example, "−5" is expressed as "1011b" in 4 bits (two's complement). The shift amount (level) of the value may be separated to a shift amount (level) in which zero are added to high-significant 2 bits ("1000b"=−8) and a shift amount (level) of the low-significant 2 bits ("11b"=3), thus resulting in −8+3=−5. As described above, the multiplication/add-up part 63a of the second exemplary embodiment may realize intended right shift as it is even in a case where the element values of the logarithmically quantized input data are a negative value.

In the present disclosure, explained are methods for reducing the number of multiplications required for convolution computation using example of an inference device for inferring (determining) a result from input data. However, there are no difference between the inference device and a learning device which generates weights in an aspect of utility of convolutional neural network (actions in middle layers). That is, although the input data is data to be an inference target and the input data to an inference part of the learning device is teach data, there is no difference between them from an aspect in "inference". That is, a learning device may be configured by additionally installing an error backpropagation part for executing error backpropagation, a weight update part for updating weights, and the like into the inference device 10 explained above. Herein, the error backpropagation part and the weight update part may be realized with a known algorithm, etc., thus explanation of them are omitted.

In addition, in the plurality of flowcharts used above explanation, a plurality of steps (processes) are described in an order. However, execution sequence of the steps executed in each of the exemplary embodiments is not limited to such order as described. In each of the exemplary embodiments, the order of the steps may be changed to an extent that it does not interfere with the content, for example, by executing each process in parallel, and the like. Further, each of the above exemplary embodiments may be combined to an extent that it does not interfere with the content.

The above exemplary embodiments may be partially or entirely described as follows, but not limited thereto.

[Mode 1]
The inference device as described in the above first aspect.

[Mode 2]
The inference device preferably according to Mode 1, wherein the PE comprises:
a selector into which inputs the elements of the input data and the weight elements are input, and
a plurality of accumulation processors each calculating and storing cumulative sum of the weights for each of the variable values of the input data elements,
wherein the selector determines an accumulation processor to be an output destination of the input weight elements among the plurality of add-up processors.

[Mode 3]
The inference device preferably according to Mode 2, wherein
the PE comprises a plurality of multipliers respectively associated with the plurality of accumulation processors, and
each of the plurality of multipliers is assigned to a value to be multiplied with the cumulative sum value of the weights.

[Mode 4]
The inference device preferably according to Mode 3, wherein
the PE comprises an add-up processor into which the multiplication results by the plurality of multipliers are input and that adds up them.

[Mode 5]
The inference device preferably according to Mode 4, wherein
the input data storage part stores quantized input data,
the PE comprises a separation part that factorize the input data elements and separates the factorized input data to predetermined first factor group and second factor group, and a shifting part which shifts the weight element values by the number of bits corresponding to the values of the second factor group, and
the selector determines the output destination of the weight elements according to the value of the first factor group.

[Mode 6]
The inference device preferably according to Mode 5, wherein
the plurality of accumulation processors is arranged for each of variable values of the first factor group, each of the plurality of multipliers is assigned to a value obtained by fixing the second factor group at zero and varying the first factor group in the input data separated to the first factor group and the second factor group as a value to be multiplied with the cumulative sum value of the weights.

[Mode 7]

The inference device preferably according to any one of Modes 2 to 6, comprising:

a weight processing part that accesses to the weight storage part and provides the weights to the selector, and an input data processing part that accesses to the input data storage part and provides the input data to the selector, wherein the weight processing part and the input data processing part do not provide to the selector the input data element whose element value is zero in the input data and a corresponding weight element.

[Mode 8]

The inference device preferably according to any one of Modes 2 to 7, wherein the plurality of accumulation processors is respectively configured by comprising an add-up processor and a register.

[Mode 9]

The inference device preferably according to any one of Modes 2 to 7, wherein the plurality of accumulation processors respectively comprises a register, the PE comprises:

a cumulative sum value selector that selects one output of the accumulation processor among the plurality of accumulation processors based on the variable values of the input data element, and a shared add-up processor that adds the value output by the cumulative sum value selector to the weight element value and outputs summation result to the selector.

[Mode 10]

The inference device preferably according to any one of Modes 1 to 9, wherein the PE further comprises an input data restriction part that restricts variable values of the input data obtained from the input data storage part.

[Mode 11]

The inference device preferably according to any one of Modes 1 to 10, comprising:

a plurality of PEs, wherein the plurality of PEs executes convolution computation in convolutional neural network in parallel.

[Mode 12]

The convolution computation method as described in the above second aspect.

[Mode 13]

The program as described in the above third aspect.

Herein, Modes 12 and 13 may be developed as those of Modes 2 to 11, like as Mode 1.

Each disclosure of the above Non-Patent Literatures, etc., is incorporated herein by reference thereto. Variations and adjustments of the exemplary embodiment and examples are possible within the ambit of the disclosure (including the claims) of the present invention and based on the basic technical concept of the present invention. Various combinations and selections of various disclosed elements (including the elements in the claims, exemplary embodiment, examples, drawings, etc.) are possible within the ambit of the disclosure of the present invention. Namely, the present invention of course includes various variations and modifications that could be made by those skilled in the art according to the overall disclosure including the claims and the technical concept. The description discloses numerical value ranges. However, even if the description does not explicitly disclose arbitrary numerical values or small ranges included in the ranges, these values and ranges should be deemed to have been concretely disclosed.

REFERENCE SIGNS LIST 10, 100 inference device
11 input layer executing part
12 middle layer executing part
13 output layer executing part
31 convolutional layer executing part
32 activation function executing part
33 pooling layer executing part
40 convolutional layer controlling part
41, 41-1 to 41-4, 103 PE (Processing Element)
51, 101 weight storage part
52, 102 input data storage part
53 computation result storage part
60 PE controlling part
61 weight processing part
62 input data processing part
63, 63a, 63b multiplication/add-up part
64 input data restriction part
70 multiplication/add-up controlling part
71, 71a selector
72, 72-0 to 72-15 accumulation processor
73, 73-0 to 73-15 multiplier
74, 75, 75-0 to 75-15, 79 add-up processor
76, 76-0 to 76-15 register
77 separation part
78 shifting part
91 CPU (Central Processing Unit)
92 memory
93 input/output interface
94 NIC (Network Interface Card)
501, 502 weights
511, 512 weight group
601, 611 input data

What is claimed is:

1. An inference device, comprising:
a weight storage that stores weights,
an input data storage that stores input data, and
a PE (Processing Element) that executes convolution computation in a convolutional neural network using the weights and the input data, wherein
the PE comprises one or more processors that are configured to implement:
a selector into which the elements of the input data and the weight elements are input,
a plurality of accumulation processors each calculating and storing cumulative sum of the weights for each of the variable values of the input data elements,
a plurality of multipliers respectively associated with the plurality of accumulation processors and assigned to a value to be multiplied with the cumulative sum value of the weights, and
an add-up processor into which the multiplication results by the plurality of multipliers are input and that adds up the multiplication results, wherein the selector determines an accumulation processor to be an output destination of the input weight elements among the plurality of accumulation processors, wherein the accumulation processor adds up weight elements to be multiplied with elements of the input data for each of variable values of the elements of the input data, wherein the multiplier multiplies each of the variable values of the elements of the input data with each cumulative sum value of weights corresponding to the variable values of the elements of the input data, and wherein the add-up processor adds up a plurality of multiplication results obtained by the multiplication.

2. The inference device according to claim 1, wherein the input data storage stores quantized input data, the one or more processors of the PE are further configured to implement a separation processor that factorizes the input data elements and separates the factorized input data to predetermined first factor group and second factor group, and a shifting processor which shifts the weight element values by the number of bits corresponding to the values of the second factor group, and the selector determines the output destination of the weight elements according to the value of the first factor group.

3. The inference device according to claim 2, wherein the plurality of accumulation processors is arranged for each of variable values of the first factor group, each of the plurality of multipliers is assigned to a value obtained by fixing the second factor group at zero and varying the first factor group in the input data separated to the first factor group and the second factor group as a value to be multiplied with the cumulative sum value of the weights.

4. The inference device according to claim 1, comprising:

a weight processor that accesses to the weight storage and provides the weights to the selector, and an input data processor that accesses to the input data storage and provides the input data to the selector, wherein the weight processor and the input data processor do not provide to the selector the input data element whose element value is zero in the input data and a corresponding weight element.

5. The inference device according to claim 1, wherein the plurality of accumulation processors is respectively configured by comprising an add-up processor and a register.

6. The inference device according to claim 1, wherein the plurality of accumulation processors respectively comprises a register, the PE comprises:
  a cumulative sum value selector that selects one output of the accumulation processor among the plurality of accumulation processors based on the variable values of the input data element, and
  a shared add-up processor that adds the value output by the cumulative sum value selector to the weight element value and outputs summation result to the selector.

7. The inference device according to claim 1, wherein the PE further comprises an input data restriction processor that restricts variable values of the input data obtained from the input data storage.

8. The inference device according to claim 1, comprising:
a plurality of PEs, wherein the plurality of PEs executes convolution computation in the convolutional neural network in parallel.

9. A convolution computation method for an inference device that comprises a weight storage that stores weights, an input data storage that stores input data, a plurality of accumulation processors each calculating and storing cumulative sum of the weights for each of the variable values of the input data elements, a plurality of multipliers respectively associated with the plurality of accumulation processors and assigned to a value to be multiplied with the cumulative sum value of the weights, and an add-up processor into which the multiplication results by the plurality of multipliers are input and that adds up the multiplication results, executes convolution computation in a convolutional neural network using the weights and the input data, wherein the method comprises:

the accumulation processor adding up weight elements to be multiplied with elements of the input data for each of variable values of the elements of the input data, the multiplier multiplying each of the variable values of the elements of the input data with each cumulative sum value of weights corresponding to the variable values of the elements of the input data, and the add-up processor adding up a plurality of multiplication results obtained by the multiplication.

10. The convolution computation method according to claim 9, comprising:

factorizing the input data elements, separating the factorized input data to predetermined first factor group and second factor group, and shifting the weight element values by the number of bits corresponding to the values of the second factor group.

11. The convolution computation method according to claim 10, comprising:

fixing the second factor group at zero, and varying the first factor group in the input data.

12. The convolution computation method according to claim 9, comprising:

providing to the accumulation processor no input data element when element value is zero in the input data and a corresponding weight element.

13. A non-transitory computer readable medium storing a program executed by a computer implemented in an inference device that comprises a weight storage that stores weights, an input data storage that stores input data, a plurality of accumulation processors each calculating and storing cumulative sum of the weights for each of the variable values of the input data elements, a plurality of multipliers respectively associated with the plurality of accumulation processors and assigned to a value to be multiplied with the cumulative sum value of the weights, and an add-up processor into which the multiplication results by the plurality of multipliers are input and that adds up the multiplication results, executes convolution computation in a convolutional neural network using the weights and the input data, wherein the program causes the computer to execute the following processes:

adding up weight elements to be multiplied with elements of the input data for each of variable values of the elements of the input data by the accumulation processor, multiplying each of the variable values of the elements of the input data with each cumulative sum value of weights corresponding to the variable values of the elements of the input data by the multiplier, and adding up a plurality of multiplication results obtained by the multiplication by the add-up processor.

14. The non-transitory computer readable medium storing a program executed by a computer implemented in an inference device according to claim 13, comprising:
    factorizing the input data elements,
    separating the factorized input data to predetermined first factor group and second factor group, and
    shifting the weight element values by the number of bits corresponding to the values of the second factor group.

15. The non-transitory computer readable medium storing a program executed by a computer implemented in an inference device according to claim 14, comprising:
    fixing the second factor group at zero, and
    varying the first factor group in the input data.

16. The non-transitory computer readable medium storing a program executed by a computer implemented in an inference device according to claim 15, comprising:
    providing to the accumulation processor no input data element when element value is zero in the input data and a corresponding weight element.

17. The non-transitory computer readable medium storing a program executed by a computer implemented in an inference device according to claim 13, wherein
    the inference device executes convolution computation in the convolutional neural network in parallel.

* * * * *